United States Patent
Ito et al.

(10) Patent No.: US 12,160,740 B2
(45) Date of Patent: Dec. 3, 2024

(54) CORE NETWORK DEVICE, ACCESS NETWORK DEVICE, COMMUNICATION TERMINAL, COMMUNICATION SYSTEM, AND COMMUNICATION METHOD

(71) Applicant: NEC Corporation, Tokyo (JP)

(72) Inventors: Hironori Ito, Tokyo (JP); Toshiyuki Tamura, Tokyo (JP); Anand Raghawa Prasad, Tokyo (JP)

(73) Assignee: NEC CORPORATION, Tokyo (JP)

( * ) Notice: Subject to any disclaimer, the term of this patent is extended or adjusted under 35 U.S.C. 154(b) by 173 days.

(21) Appl. No.: 17/272,368

(22) PCT Filed: Aug. 29, 2019

(86) PCT No.: PCT/JP2019/033986
§ 371 (c)(1),
(2) Date: Mar. 1, 2021

(87) PCT Pub. No.: WO2020/050138
PCT Pub. Date: Mar. 12, 2020

(65) Prior Publication Data
US 2021/0329452 A1 Oct. 21, 2021

(30) Foreign Application Priority Data
Sep. 3, 2018 (JP) .................................. 2018-164410

(51) Int. Cl.
*H04W 12/08* (2021.01)
*H04W 12/037* (2021.01)
(Continued)

(52) U.S. Cl.
CPC ........... *H04W 12/08* (2013.01); *H04W 12/06* (2013.01); *H04W 12/40* (2021.01); *H04W 60/00* (2013.01); *H04W 12/037* (2021.01)

(58) Field of Classification Search
CPC ..... H04W 12/08; H04W 12/06; H04W 12/40; H04W 60/00; H04W 12/037; H04W 88/14; H04W 92/045; H04L 63/205
See application file for complete search history.

(56) References Cited

U.S. PATENT DOCUMENTS

| | | | |
|---|---|---|---|
| 11,553,388 B2* | 1/2023 | Wu | H04W 36/0072 |
| 2018/0007552 A1* | 1/2018 | Bae | H04W 12/041 |
| 2018/0227873 A1* | 8/2018 | Vrzic | H04W 28/26 |
| 2018/0317273 A1* | 11/2018 | Kim | H04W 76/22 |
| 2018/0352483 A1* | 12/2018 | Youn | H04W 76/11 |

(Continued)

FOREIGN PATENT DOCUMENTS

| | | |
|---|---|---|
| WO | 2017/188392 A1 | 11/2017 |
| WO | 2018/128125 A1 | 7/2018 |
| WO | 2018/135524 A1 | 7/2018 |

OTHER PUBLICATIONS

ETSI TS 133 501 V15.1.0 (Jul. 2018) Technical Specification 5G; Security architecture and procedures for 5G System (3GPP TS 33.501 version 15.1.0 Release 15), pp. 48-49 and 55-57 (Year: 2018).*

(Continued)

*Primary Examiner* — Brandon J Miller
(74) *Attorney, Agent, or Firm* — Sughrue Mion, PLLC

(57) ABSTRACT

It is an object to provide a core network device that can satisfy security requirements required for respective network slices. A core network device (10) according to the present disclosure includes a storage unit (11) configured to store a security parameter associated with a network slice allowing a communication terminal. The core network device (10) further includes a communication unit (12) configured to transmit identification information on the network slice, and identification information on the security parameter to the communication terminal.

23 Claims, 24 Drawing Sheets

(51) Int. Cl.
H04W 12/06 (2021.01)
H04W 12/40 (2021.01)
H04W 60/00 (2009.01)

(56) References Cited

U.S. PATENT DOCUMENTS

2019/0373461 A1  12/2019  Ito et al.
2020/0015311 A1*  1/2020  Kim .................... H04W 68/005
2020/0053818 A1*  2/2020  Sillanpaa .............. H04W 60/02
2021/0195509 A1*  6/2021  Ohlsson ............. H04W 12/037

OTHER PUBLICATIONS

Extended European Search Report for EP Application No. 19857066.5 dated on Sep. 28, 2021.

"3rd Generation Partnership Project; Technical Specification Group Services and System Aspects; Study on the security aspects of the next generation system (Release 14)", Technical Report, 3GPP TR 33.899, V1.3.0. Aug. 31, 2017, pp. 1-605.

International Search Report for PCT Application No. PCT/JP2019/033986, mailed on Oct. 8, 2019.

3GPP TS33.501 V15.1.0 (Jun. 2018), 3rd Generation Partnership Project; Technical Specification Group Services and System Aspects;Security architecture and procedures for 5G system (Release 15), pp. 1-152.

LG Electronics, "Discussion on the access control per network slice", 3GPP TSG SA WG2 Meeting #123, S2-176966, Oct. 23-27, 2017, Ljubljana, Slovenia, pp. 1-3.

Qualcomm Incorporated, "Discussion on the privacy considerations of NSSAI", 3GPP TSG SA WG3 (Security) Meeting #88, S3-172004, Aug. 7-11, 2017, Dali, China.

* cited by examiner

| IE/Group Name | Presence | Range | IE type and reference | Semantics description | Criticality | Assigned Criticality |
|---|---|---|---|---|---|---|
| Message Type | M | | 9.3.1.1 | | YES | ignore |
| RAN UE NGAP ID | M | | 9.3.3.2 | | YES | reject |
| NAS-PDU | M | | 9.3.3.4 | | YES | reject |
| User Location Information | M | | 9.3.1.16 | | YES | reject |
| RRC Establishment Cause | O | | OCTET STRING | This IE may need to be refined, including its presence | YES | ignore |
| 5G-S-TMSI | O | | 9.3.3.20 | | YES | reject |
| GUAMI | O | | 9.3.3.3 | | YES | reject |
| AMF Set ID | O | | 9.3.3.12 | | YES | ignore |
| UE Context Request | O | | ENUMERATED (requested, ...) | Indicates that a UE context including security information needs to be setup at the NG-RAN. | YES | ignore |
| NSSAI | | | | | | |

Fig. 14

```
Security header type (octet 1)

Bits
4 3 2 1
0 0 0 0  Plain 5GS NAS message, not security protected

Security protected 5GS NAS message:
0 0 0 1  Integrity protected
0 0 1 0  Integrity protected and ciphered
0 0 1 1  Integrity protected with new 5G NAS security context (NOTE 1)
0 1 0 0  Integrity protected and ciphered with new 5G NAS security context
         (NOTE 2)

All other values are reserved.
```

| NOTE 1: | This codepoint may be used only for a SECURITY MODE COMMAND message. |
|---|---|
| NOTE 2: | This codepoint may be used only for a SECURITY MODE COMPLETE message. |

Fig. 16

| | 8 | 7 | 6 | 5 | 4 | 3 | 2 | 1 | |
|---|---|---|---|---|---|---|---|---|---|
| UE network capability IEI | | | | | | | | | octet 1 |
| Length of UE network capability contents | | | | | | | | | octet 2 |
| EEA0 | 128-EEA1 | 128-EEA2 | 128-EEA3 | EEA4 | EEA5 | EEA6 | EEA7 | | octet 3 |
| EIA0 | 128-EIA1 | 128-EIA2 | 128-EIA3 | EIA4 | EIA5 | EIA6 | EIA7 | | octet 4 |
| UEA0 | UEA1 | UEA2 | UEA3 | UEA4 | UEA5 | UEA6 | UEA7 | | octet 5* |
| UCS2 | UIA1 | UIA2 | UIA3 | UIA4 | UIA5 | UIA6 | UIA7 | | octet 6* |
| ProSe-dd | ProSe | H.245-ASH | ACC-CSFB | LPP | LCS | 1xSR VCC | NF | | octet 7* |
| ePCO | HC-CP CIoT | ERw/o PDN | S1-U data | UP CIoT | CP CIoT | Prose-relay | ProSe-dc | | octet 8* |
| 15 bearers | SGC | N1mode | DCNR | CP backoff | Restric tEC | V2X PC5 | multipl eDRB | | octet 9* |
| 0 | 0 | 0 | 0 | 0 | 0 | 0 | NS sec | | octet 10* - 15* |
| Spare | | | | | | | | |

Fig. 21

CORE NETWORK DEVICE, ACCESS NETWORK DEVICE, COMMUNICATION TERMINAL, COMMUNICATION SYSTEM, AND COMMUNICATION METHOD

This application is a National Stage Entry of PCT/JP2019/033986 filed on Aug. 29, 2019, which claims priority from Japanese Patent Application 2018-164410 filed on Sep. 3, 2018, the contents of all of which are incorporated herein by reference, in their entirety.

TECHNICAL FIELD

The present disclosure relates to a core network device, an access network device, a communication terminal, a communication system, and a communication method.

BACKGROUND ART

As for 5G (5 Generation) networks, service providing using network slices has been discussed. The network slice is at least one logical network defined on a physical network. The network slice may also be called a network slice instance. A certain network slice may be, for example, a network slice that provides a public safety service. Another network slice may be a network slice that secure extremely short delay time, or a network slice that accommodates battery-driven IoT (Internet Of Things) terminals.

Security requirements required for each network slice vary. For example, network slices that provides a public safety service require a security level higher than a typically required security level. Network slices that secure an extremely short delay time require an authentication process that is to be completed in a shorter time period. Network slices that accommodate battery-driven IoT terminals require an authentication process using a lightweight algorithm for suppressing battery consumption of IoT terminals.

Non Patent Literature 1 discloses an authentication process for a communication terminal (e.g., user equipment: UE) in a 5G network. Non Patent Literature 1 discloses an authentication process executed between UE, and a serving network and a home network, in primary authentication and key agreement. The serving network is, for example, a network that UE accesses for using a service provided in a network slice.

CITATION LIST

Non Patent Literature

Non Patent Literature 1: 3GPP TS33.501 V15.1.0 (2018-06)

SUMMARY OF INVENTION

Technical Problem

In the 5G network, multiple network slices are defined. The security requirements vary among individual network slices. However, Non Patent Literature 1 only discloses the authentication process between UE, and a serving network and a home network. Accordingly, the UE uses a security parameter applied in relation to the 5G network, as a security parameter common among multiple network slices, and uses services provided in the respective network slices. That is, the authentication process disclosed in Non Patent Literature 1 has a problem in that if security requirements required for the respective network slices are different from each other, the security requirements required for the respective network slices cannot be satisfied.

The present disclosure has an object to provide a core network device, an access network device, a communication terminal, a communication system, and a communication method that can satisfy the security requirements required for the respective network slices.

Solution to Problem

A core network device according to a first aspect of the present disclosure includes: a storage unit configured to store a security parameter associated with a network slice allowing a communication terminal; and a communication unit configured to transmit identification information on the network slice, and identification information on the security parameter, to the communication terminal.

An access network device according to a second aspect of the present disclosure includes a communication unit configured to receive identification information on a security parameter associated with a network slice allowing a communication terminal and on the network slice, and transmit the identification information on the security parameter and the identification information on the network slice to the communication terminal.

A communication terminal according to a third aspect of the present disclosure includes: a storage unit configured to store a security parameter associated with a network slice allowing the communication terminal; and a communication unit configured to receive identification information on the network slice, and identification information on the security parameter.

A communication system according to a fourth aspect of the present disclosure includes: a core network device that comprises a first storage unit configured to store a security parameter associated with a network slice allowing a communication terminal, and a first communication unit configured to transmit identification information on the network slice, and identification information on the security parameter, to the communication terminal; and the communication terminal that comprises a second storage unit configured to store the security profile, and a second communication unit configured to receive the identification information on the network slice, and the identification information on the security parameter.

A communication method according to a fifth aspect of the present disclosure executed in a core network device, includes: storing a security parameter associated with a network slice allowing a communication terminal; and transmitting identification information on the network slice, and identification information on the security parameter, to the communication terminal.

Advantageous Effects of Invention

The present disclosure can provide a core network device, an access network device, a communication terminal, a communication system, and a communication method that can satisfy the security requirements required for the respective network slices.

BRIEF DESCRIPTION OF THE DRAWINGS

FIG. 14 illustrates an initial UE message according to the third example embodiment.

FIG. 16 shows setting content of "Security header type associated with a spare half octet" field according to the third example embodiment.

FIG. 21 shows a UE network capability information element according to the fourth example embodiment.

DESCRIPTION OF EMBODIMENTS

First Example Embodiment

Figure 1:
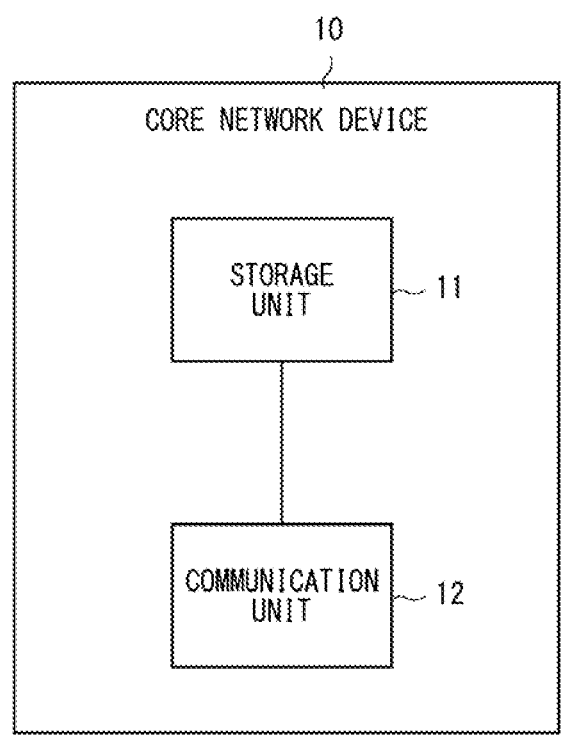
FIG. 1 is a configuration diagram of a core network device according to a first example embodiment.

Hereinafter, referring to the drawings, example embodiments of the present disclosure are described. A configuration example of a core network device 10 according to a first example embodiment is described with reference to FIG. 1. For example, the 3GPP (3rd Generation Partnership Project) defines an access network and a core network. A network that includes an access network and a core network may be called a mobile network. The core network device 10 is a device arranged in a core network.

The core network device 10 may be a computer device that operates by a processor executing a program stored in a memory. The core network device 10 may be, for example, a gateway device, a server device or the like.

The core network device 10 includes a storage unit 11, and a communication unit 12. The communication unit may be a transmission unit and a reception unit. The storage unit 11 and the communication unit 12 may be software or modules whose processes are executed by the processor executing programs stored in the memory. Alternatively, the storage unit 11 and the communication unit 12 may be hardware, such as circuits or chips.

The storage unit 11 stores security parameters associated with network slices allowing communication terminals. The security parameters are included in a security profile, for example. In other words, the storage unit 11 stores the security profile. The security profile defines at least one or more security parameter. The security parameter is a parameter used when the core network device 10 executes a security process with a communication terminal.

The security parameter may be, for example, an authentication algorithm, an encryption algorithm, an integrity protection algorithm or the like. The security profile may include information that indicates presence or absence of execution of encryption, or presence or absence of execution of integrity protection. The integrity protection may be called integrity securement.

The communication unit 12 transmits identification information on network slices and identification information on security parameters to communication terminals. The identification information on the network slices may be used for uniquely identifying all the network slices provided in the 5G network, for example. Here, the 5G network may be a network managed by one telecommunications carrier, or a network where a network managed by one telecommunications carrier and a network managed by another telecommunications carrier, service provider or the like are connected to each other.

The identification information on security parameters may be information for uniquely identifying various algorithms used for security processes, for example.

The communication terminals may be UE (User Equipment), which is used as a collective term of communication terminals in 3GPP. The communication terminals may be mobile phone terminals, smartphone terminals, tablet terminals or the like. The communication terminals maybe IoT terminals, MTC (Machine Type Communication) terminals, terminals for Public Safety Service, industrial IoT (IIoT) terminals for URLLC (Ultra-Reliable and Low Latency Communications) or the like.

As described above, the core network device 10 can transmit identification information on network slices, and identification information on security parameters to the communication terminals. Accordingly, the communication terminals and the core network device 10 can share the information on security parameters used when the communication terminals use the network slices. As a result, the communication terminals and the core network device 10 can execute security processes using security parameters that are different among the network slices to be used.

Second Example Embodiment

Figure 2:
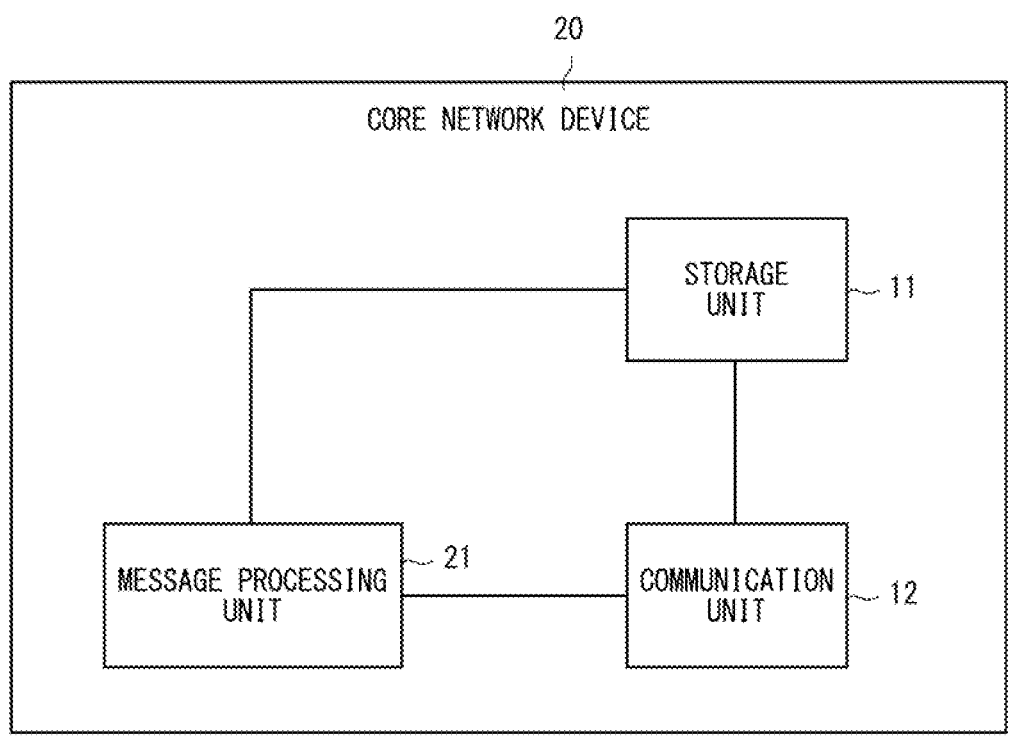
FIG. 2 is a configuration diagram of a core network device according to a second example embodiment.

Subsequently, a configuration example of a core network device 20 according to a second example embodiment is described with reference to FIG. 2. The core network device 20 includes a message processing unit 21, in addition to the storage unit 11 and the communication unit 12 that have been described in relation to the core network device 10. The storage unit 11 and the communication unit 12 are similar to those in FIG. 1. Accordingly, detailed description thereof is omitted. The core network device 20 may be, for example, an AMF (Access Management Function) entity. The AMF entity performs management, such as of access and mobility about UE. Furthermore, the AMF entity cooperates with an AUSF (Authentication Server Function) entity, a UDM (Unified Data Management) entity and the like, and performs an authentication process about UE 20. Hereinafter, the AMF entity, the AUSF entity, and the UDM entity may be called AMF, AUSF, and UDM, respectively. The core network device 20 may be, for example, a UPF (User Plane Function) entity that handles user plane data.

The message processing unit 21 encrypts a message to be transmitted to the UE. Furthermore, this unit decrypts a message received from the UE. The message processing unit 21 executes an integrity protection process for the message to be transmitted to UE, and the message received from UE. The message processing unit 21 performs message encryption or decryption, and further performs the integrity protection process using the security profile stored in the storage unit 11. The message may be, for example, a control message to be transferred to and from the UE. The control message may also be called control plane (CP) data. The control message may be, for example, an NAS (Non Access Stratum) message. The message processing unit 21 can perform encryption or decryption that is different among network slices. In other words, the message processing unit 21 performs a security process using encryption algorithms and integrity protection algorithms that are different among individual network slices. AMF may have SEAF (Security Anchor Function), and is sometimes represented as AMF/SEAF. SEAF may be an entity independent of AMF.

The core network device 20 executes a communication method. Specifically, the core network device 20 stores security parameters associated with network slices allowing communication terminals. Next, the core network device 20 transmits identification information on network slices, and identification information on security parameters to the communication terminals.

Figure 3:
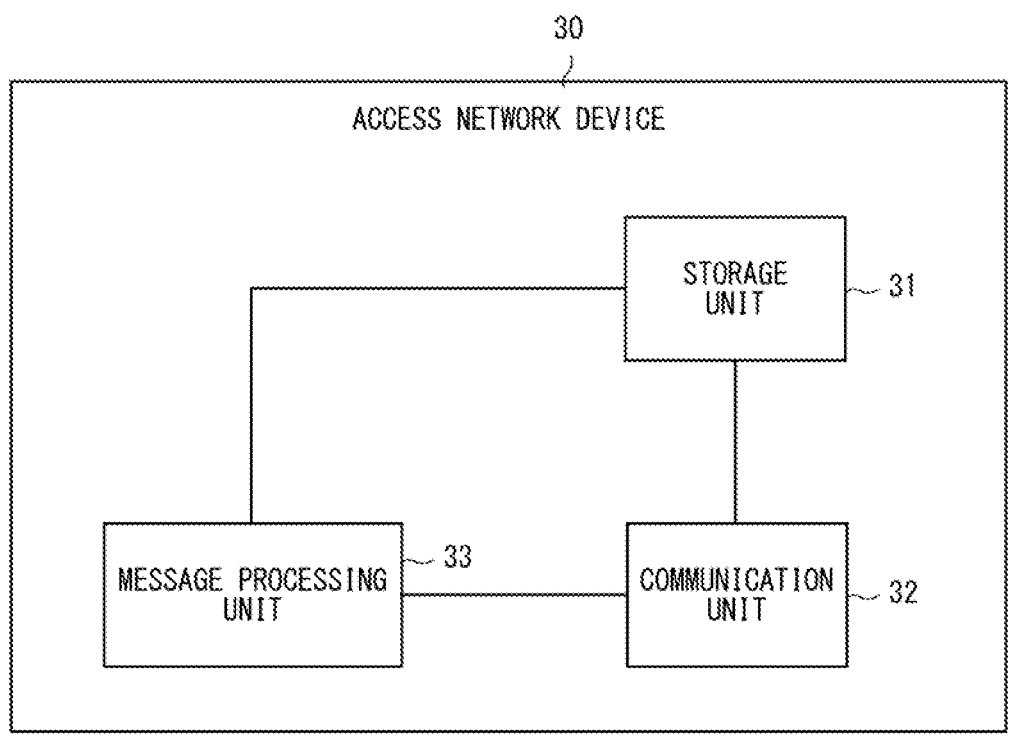
FIG. 3 is a configuration diagram of an access network device according to the second example embodiment.

Subsequently, a configuration example of an access network device 30 according to the second example embodiment is described with reference to FIG. 3. The access network device 30 may be, for example, a (R)AN ((Radio) Access Network) device, gNB (g Node B), or NGRAN. The access network device 30 may be, for example, the non-3GPP interworking function (N3IWF) dealing with untrusted non-3GPP access. Hereinafter, the (R)AN device is called (R)AN. The access network device 30 includes a storage unit 31, a communication unit 32, and a message processing unit 33, and has a configuration basically similar to that of the core network device 20. The difference of the access network device 30 from the core network device 20 is appropriately described in a processing sequence and the like described later.

The access network device 30 executes a communication method. Specifically, the access network device 30 receives identification information on a security parameter associated with a network slice allowing a communication terminal and on the network slice. Next, the access network device 30 transmits the identification information on the security parameter, and the identification information on the network slice, to the communication terminal.

Figure 4:
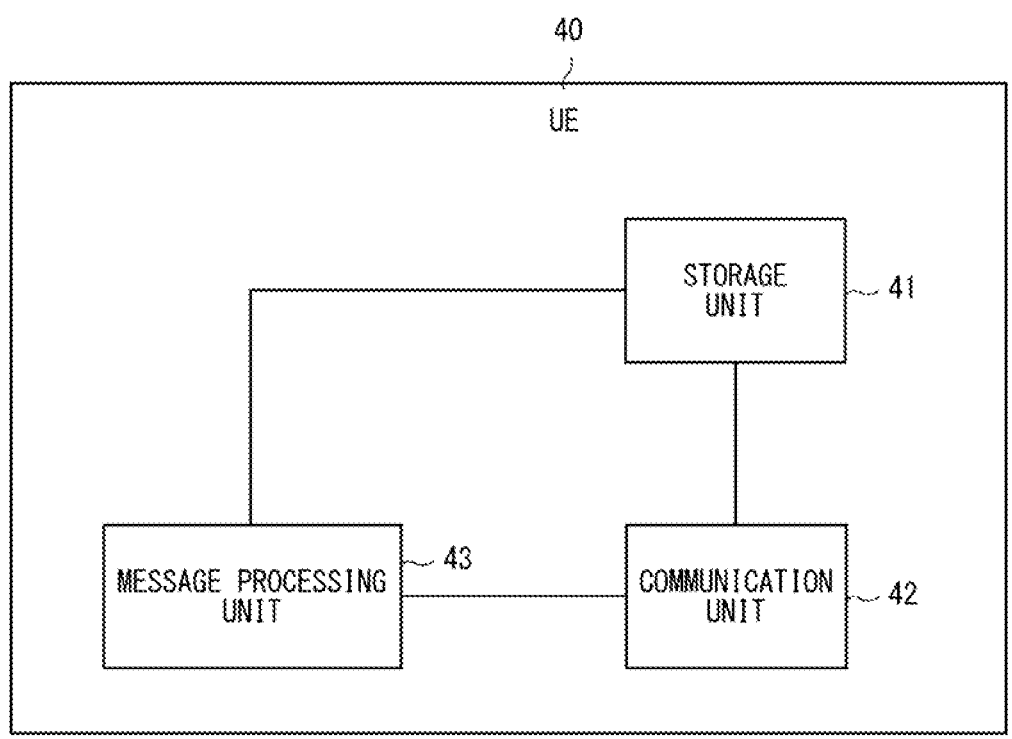
FIG. 4 is a configuration diagram of UE according to the second example embodiment.

Subsequently, the configuration of UE 40 according to the second example embodiment is described with reference to FIG. 4. The UE 40 corresponds to the communication terminal described in first example embodiment. The UE 40 includes a storage unit 41, a communication unit 42, and a message processing unit 43, and has a configuration basically similar to that of the core network device 20. The difference of the UE 40 from the core network device 20 is appropriately described in a processing sequence and the like described later.

The UE 40 executes a communication method. Specifically, the UE 40 stores a security parameter associated with a network slice allowing this UE. Next, the UE 40 receives the identification information on the network slice, and the identification information on the security parameter.

Figure 5:
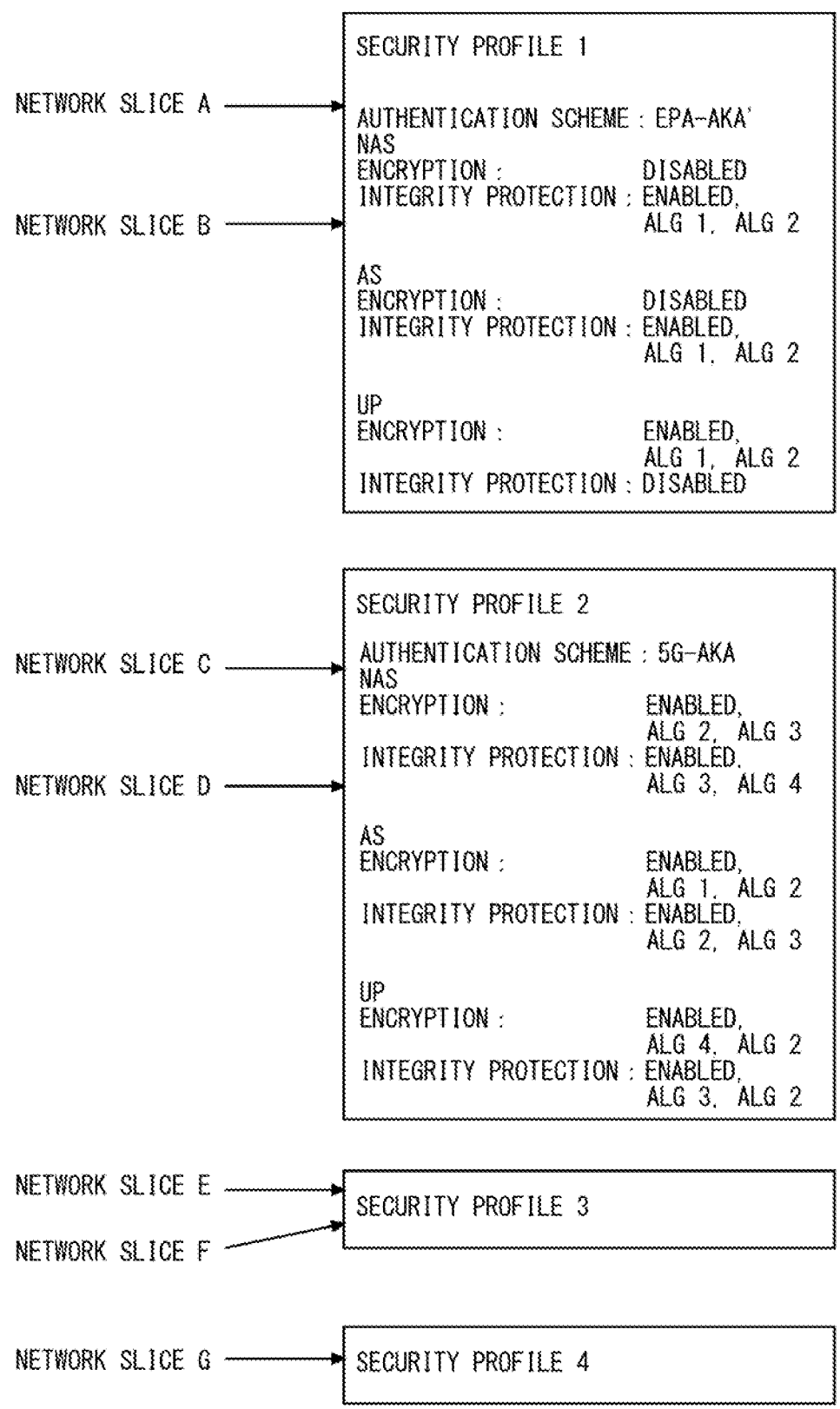
FIG. 5 shows the relationships between network slices and security profiles according to the second example embodiment.

Here, the security profile is described in detail with reference to FIG. 5. FIG. 5 shows that the network slices and the security profiles are associated with each other. For example, network slices A and B are associated with a security profile 1. Association of the network slice A with the security profile 1 means that during use of the network slice A, the security profile 1 is used by each device executing the security process. Furthermore, network slices C and D are associated with a security profile 2. Moreover, network slices E and F are associated with a security profile 3. Furthermore, a network slice G is associated with a security profile 4.

The security profile defines an authentication scheme, presence or absence of execution of encryption of an NAS message, an AS message and user plane (UP) data, and presence or absence of execution of integrity protection of the NAS message, AS message and user plane data. This profile also defines an algorithm used when encryption is executed, and an algorithm used when integrity protection is executed. The user plane data may also be called user data. Multiple authentication schemes and algorithms may be listed in a descending order of priority.

For example, according to the security profile 1, the authentication scheme EAP-AKA' is used, and the NAS message and the AS message are not encrypted but are subjected to integrity protection. Moreover, according to the security profile 1, the user plane data is encrypted, but is not subjected to integrity protection. Furthermore, for integrity protection of the NAS message, ALG1 and ALG2 are used as algorithms. For integrity protection of the AS message, ALG1 and ALG2 are used as algorithms. For encrypting the user plane data, ALG1 and ALG2 are used as algorithms. Detailed description of security profiles 2, 3 and 4 are omitted. The security profile may be stored as subscriber information in UDM. This security profile is associated with a network slice. Accordingly, for example, for a slice used for URLLC (Ultra-Reliable and Low Latency Communications), an algorithm capable of high-speed processing is adopted as the algorithm used to encrypt the user plane data; this adoption can prevent delay of the device due to computation, and allow URLLC communication. For example, the algorithm capable of high-speed processing may be RC2, FEAL-N (First Encryption Algorithm-N), GCC (Gao's Chaos Cryptosystem), RC4, or SEAL. Furthermore, the security profile may be configured such that multiple security keys used for encryption can be generated.

Figure 6:
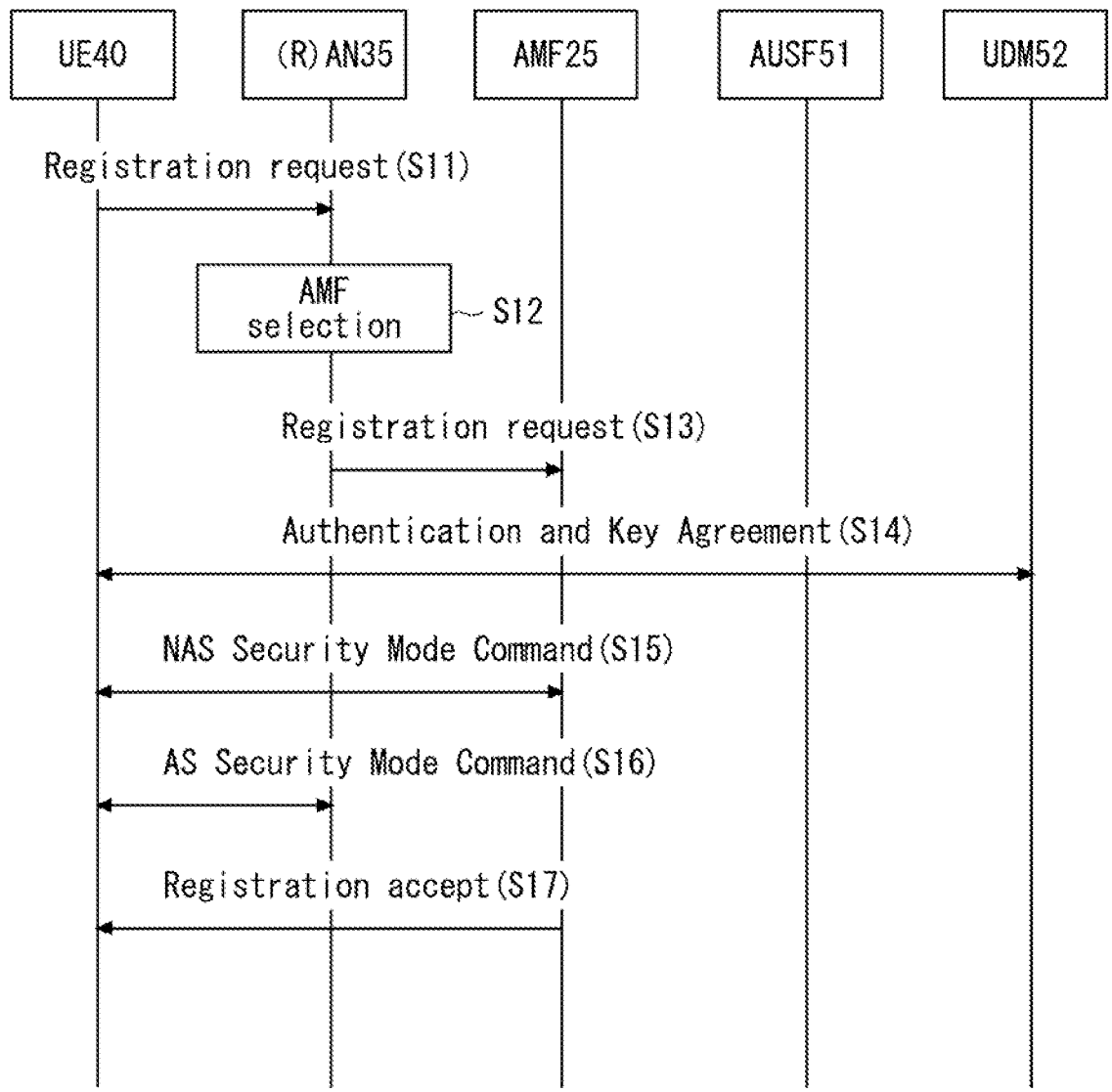
FIG. 6 shows a flow of a registration process according to the second example embodiment.

Subsequently, referring to FIG. 6, a flow of a registration process of the UE 40 according to the second example embodiment is described. In FIG. 6, the registration process is described using messages to be transferred between the UE 40, (R)AN 35, AMF 25, AUSF 51, and UDM 52.

The UE 40, (R)AN 35 and AMF 25 may be arranged in the serving network. The serving network may be, for example, VPLMN (Visited Public Land Mobile Network). The AUSF 51 and UDM 52 may be arranged in the home network. The home network may be, for example, a network managed by a telecommunications carrier with which the UE 40 contracts. In other words, the home network may be a network that manages subscriber information on the UE 40. The home network may be, for example, HPLMN (Home Public Land Mobile Network). When the UE 40 is in the range of the home network, the (R)AN 35 and AMF 25 may also be arranged in the home network.

The network slices are logical networks defined in the serving network. Alternatively, the network slices may be logical networks defined in the serving network and the home network.

First, the UE 40 transmits a registration request to the (R)AN 35 (S11). The registration request includes information on the network slice that the UE 40 requests to access. The UE 40 may request to access multiple network slices. The information on the network slice may be NSSAI (Network Slice Selection Assistance Information), which is identification information on the network slice. The registration request may include multiple pieces of NSSAI. The NSSAI included in the registration request may also be called requested NSSAI.

Next, the (R)AN 35 selects an AMF to which the registration request is transmitted (S12). For example, the (R)AN 35 may select the AMF preliminarily associated with the requested NSSAI. In step S12, it is assumed that the (R)AN 35 selects the AMF 25.

Next, the (R)AN 35 transmits the registration request to the AMF 25 selected in step S12 (S13). The registration request includes the requested NSSAI.

Next, the UE 40, AMF 25, AUSF 51 and UDM 52 execute authentication and key agreement (S14). In other words, the UE 40, AMF 25, AUSF 51 and UDM 52 authenticate each other. For example, primary authentication and key agreement are executed in authentication and key agreement.

In authentication and key agreement, the security profile associated with the network slice allowing access with reference to the subscriber information on the UE 40, is transmitted from the UDM 52, through the AUSF 51, to the AMF 25. The network slice allowing access with reference to the subscriber information on the UE 40 may also be called subscribed NSSAI. The subscribed NSSAI may include multiple network slices. After authentication about the UE 40 is completed in the authentication and key agreement, the UE 40, AMF 25 and AUSF 51 generate security keys for the respective network slices.

Next, the UE 40 and AMF 25 execute an NAS SMC (Security Mode Command) (S15). In the NAS SMC, the AMF 25 transmits, to the UE 40, identification information on the security parameter for each network slice. In the NAS SMC, the AMF 25 may transmit, to the (R)AN 35, the identification information on the security parameter for each network slice. The security parameter transmitted by the AMF 25 to the (R)AN 35 is applied to the AS message.

Next, the UE 40 and (R)AN 35 execute the AS SMC (S16). In the AS SMC, the (R)AN 35 transmits, to the UE 40, identification information on the security parameter for each network slice.

Next, the AMF 25 transmits registration accept to the UE 40 (S17). The registration accept includes information about the network slice allowing access by the UE 40 in the serving network. In the serving network, the network slice allowing access by the UE 40 may also be called allowed NSSAI. The allowed NSSAI may include multiple network slices.

Figure 7:
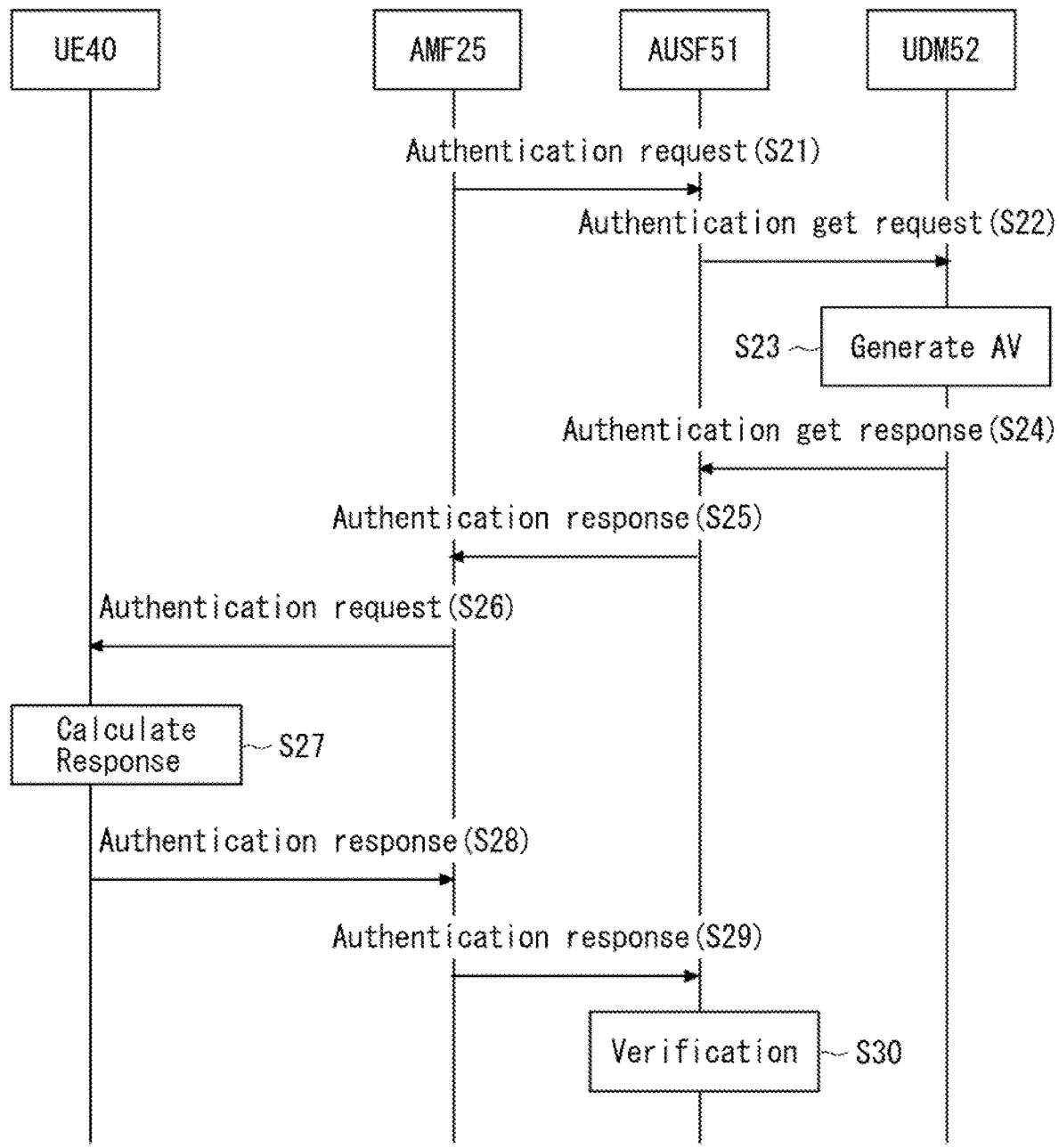
FIG. 7 shows the details of authentication and key agreement according to the second example embodiment.

Here, referring to FIG. 7, the authentication and key agreement executed in step S14 in FIG. 6 is described in detail. First, the AMF 25 transmits an authentication request to the AUSF 51 (S21). The authentication request (S21) may include the requested NSSAI transmitted from the UE to the AMF 25. Next, the AUSF 51 transmits an authentication get request to the UDM 52 (S22). The authentication get request (S22) may include the requested NSSAI transmitted from the AMF 25. Next, the UDM 52 generates an AV (Authentication Vector) (S23). The AV may include, for example, RAND, AUTN (Authentication Token), XRES (expected Response), and a security key K_AUSF. The AV may be generated in consideration of the network slice. In this case, the UDM 52 may provide multiple pieces of subscribed NSSAI with a priority sequence, and generate the AV suitable for service provided in the highest-prioritized piece of subscribed NSSAI (network slice). Alternatively, the UDM 52 may generate multiple AVs corresponding to network slices, assign identifiable identifiers to the respective AVs, and store them in the AUSF 51. In a case where the authentication process is performed again, the AUSF 51 may use an AV different from that for the first authentication, with respect to the network slice, and use another authentication scheme.

Next, the UDM 52 transmits an authentication get response to the AUSF 51 (S24). The authentication get response includes the AV generated in step S23, and the security profile. More specifically, inclusion of the security profile may be inclusion of the subscribed NSSAI about the UE 40, and the security profile associated with the subscribed NSSAI. If the authentication get request (S22) includes the requested NSSAI, the authentication get response may only include the security profile related to the requested NSSAI.

Next, the AUSF 51 transmits an authentication response to the AMF 25 (S25). The authentication request includes the AV and the security profile received in step S24.

Next, the AMF 25 transmits the authentication request to the UE 40 (S26). The authentication request includes, for example, RAND and AUTN included in the AV received in step S25. Next, the UE 40 calculates RES using the received AV (S27). Next, the UE 40 transmits the authentication response to the AMF 25 (S28). The authentication response includes the RES calculated in step S27.

Next, the AMF 25 transmits an authentication response to the AUSF 51 (S29). The authentication response includes the RES received in step S28. Next, the AUSF 51 authenticates the UE 40 by comparing the XRES received from UDM 52 in step S24 with the RES received from the AMF 25 in step S29 (S30). If the XRES coincides with the RES, the AUSF 51 authenticates the UE 40 as a device accessible to the serving network.

Subsequently, referring to FIG. 8, the NAS SMC executed in step S15 in FIG. 6 is described in detail. First, the AMF 25 determines algorithms for encryption and integrity protection that are used for NAS messages of all the network slices indicated by the subscribed NSSAI, and common NAS messages independent of the network slices. Furthermore, the AMF 25 starts integrity protection for control data (NAS messages) using the determined algorithm (S41).

Here, the NAS messages for the respective network slices may be, for example, NAS messages transferred between the UE 40 and the AMF 25, in a service request procedure, PDU session establishment, PDU session modification, PDU session release, session continuity, service continuity and UP path management, CN-initiated selective deactivation of UP connection of an existing PDU session.

Further, more specifically, the NAS messages used in the service request procedure may be those of service request, service accept, and service reject. The NAS messages used in the PDU session establishment may be those of PDU session establishment request, PDU session establishment accept, and PDU session establishment reject. The NAS messages used in the PDU session modification may be those of PDU session modification request, PDU session modification reject, PDU session modification command, PDU session modification complete, and PDU session modification command reject. The NAS messages used in the PDU session release may be those of PDU session release request, PDU session release reject, PDU session release command, and PDU session release complete.

The common NAS messages independent of the network slices may be, for example, NAS messages transferred between the UE 40 and the AMF 25 in registration procedures, deregistration procedures, UE configuration update, reachability procedures, UE capability match request procedures, connection resume procedures, and handover procedures.

For determination of the algorithm, the AMF 25 may determine the algorithm to be used from among the algorithms defined by the security profile received in step S25 in FIG. 7. Alternatively, the AMF 25 may determine a predetermined algorithm, independent of the security profile.

The integrity protection means both confirmation of the integrity protection of the received data, and assignment of a symbol for integrity protection to transmission data.

Next, the AMF 25 transmits the NAS SMC to the UE 40 (S42). The NAS SMC includes the subscribed NSSAI, and information indicating the algorithms for encryption and integrity protection determined in step S41. The information indicating the algorithms for encryption and integrity protection may be, for example, information identifying algorithms. The information identifying algorithms may be called an algorithm ID, for example.

Next, the AMF 25 starts to decrypt received control data using the algorithm for encryption determined in step S41 (S43). Furthermore, the UE 40 confirms the integrity of the NAS SMC (S44). If the UE 40 confirms that the integrity of NAS SMC has no problem, this UE 40 uses the algorithms designated by the NAS SMC to start encryption of control data to be transmitted, decryption of the received control data, and integrity protection of control data to be transmitted and received (S44).

Next, the UE 40 transmits NAS Security Mode Complete to the AMF 25 (S45). Next, the AMF 25 starts to encrypt the control data to be transmitted, using the algorithm for encryption determined in step S41 (S46).

Subsequently, referring to FIG. 9, the AS SMC executed in step S16 in FIG. 6 is described in detail. First, the (R)AN 35 determines algorithms for encryption and integrity protection that are used for AS messages of all the network slices indicated by the subscribed NSSAI, and common AS messages independent of the network slices. Furthermore, the (R)AN 35 determines the algorithms for encryption and integrity protection used for the user plane data. Moreover, the (R)AN 35 starts integrity protection for the control data and the user plane data, using the determined algorithms (S51).

For determination of the algorithm, the (R)AN 35 may receive the security profile from the AMF 25, and determine the algorithm to be used from among the algorithms defined by the received security profile. Alternatively, the (R)AN 35 may determine a predetermined algorithm, independent of the security profile. The (R)AN 35 obtains subscribed NSSAI from the AMF 25, in the registration process. If the (R)AN 35 has no subscribed NSSAI, this (R)AN 35 may request the subscribed NSSAI from the AMF 25.

The integrity protection means both confirmation of the integrity protection of the received data, and assignment of a symbol for integrity protection to transmission data.

Next, the (R)AN 35 transmits the AS SMC to the UE 40 (S52). The AS SMC includes the subscribed NSSAI, and information indicating the algorithms for encryption and integrity protection determined in step S51. The algorithms for encryption and integrity protection are algorithms for encryption and integrity protection of control data and user plane data transferred on network slices indicated by the subscribed NSSAI.

Next, the (R)AN 35 starts to decrypt the received control data and user plane data, using the algorithm for encryption determined in step S51 (S53). Furthermore, the UE 40 confirms the integrity of the AS SMC (S54). If the UE 40 confirms that the integrity of AS SMC has no problem, this UE 40 uses the algorithms designated by the AS SMC to start decryption of the received control data and user plane data, and integrity protection of control data and user plane data that are to be transmitted and received (S54).

Next, the UE 40 transmits NAS Security Mode Complete to the (R)AN 35 (S55). Next, the (R)AN 35 starts to decrypt the control data and user plane data that are to be transmitted, using the algorithm for encryption determined in step S51 (S56). Next, the UE 40 starts to encrypt the control data and user plane data that are to be transmitted, using the algorithm for encryption determined in step S54 (S57).

Figure 8:
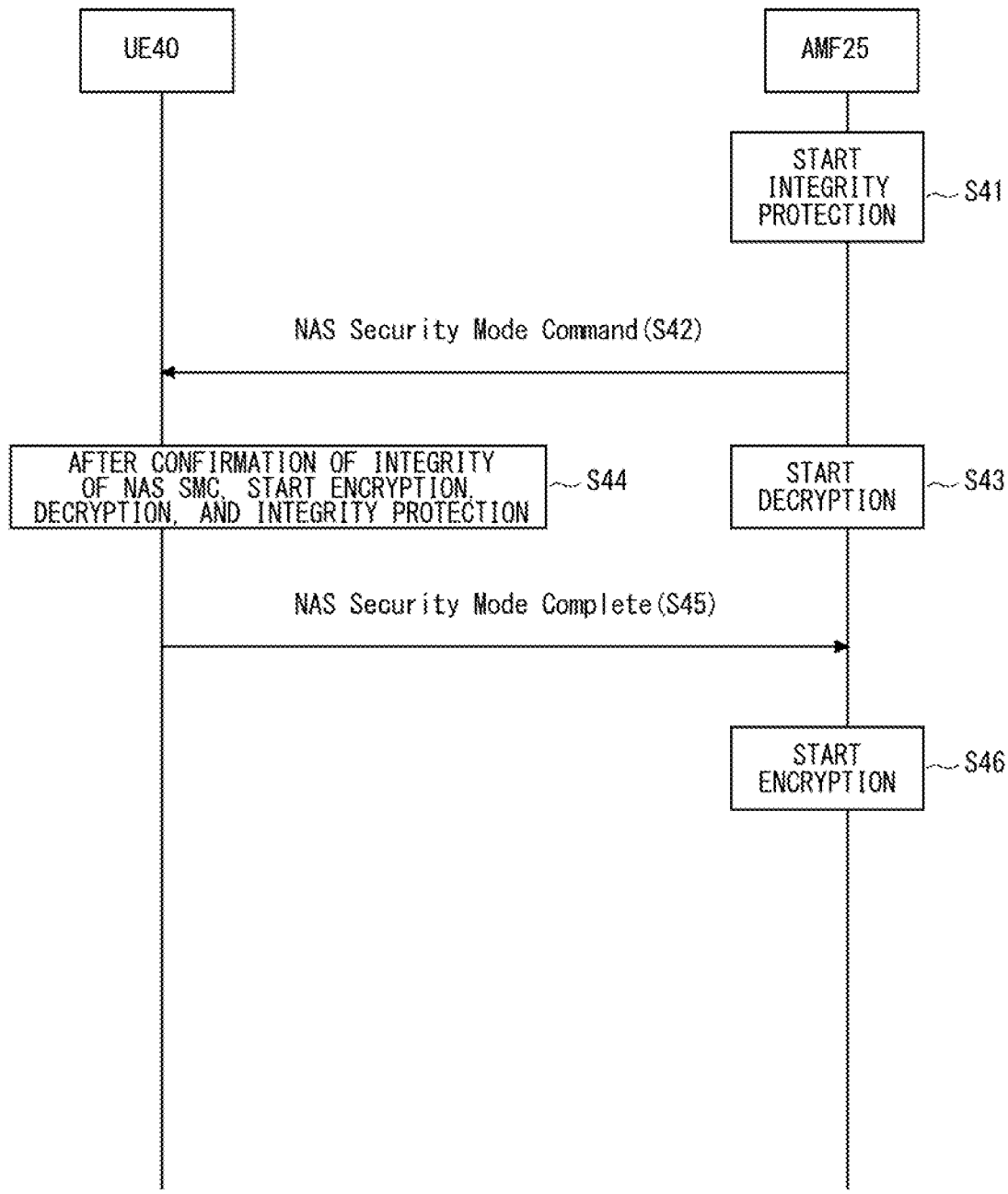
FIG. 8 shows the details of NAS SMC according to the second example embodiment.
Figure 9:
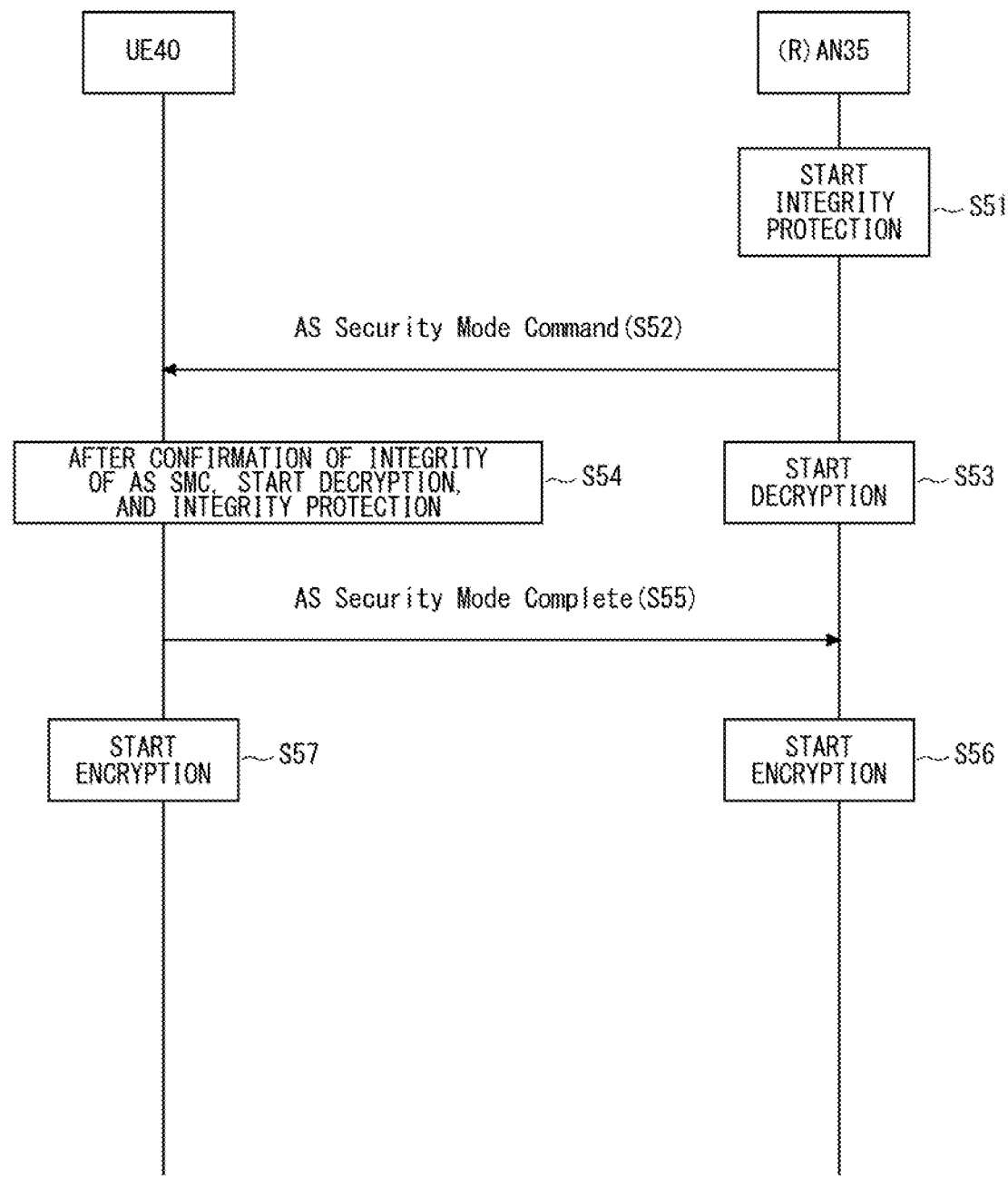
FIG. 9 shows the details of AS SMC according to the second example embodiment.

The processes shown in FIGS. 8 and 9 may be performed with respect to each network slice. At this time, by including information indicating a single network slice serving as a target (e.g., S-NSSAI), in the NAS SMC and AS SMC, the network slice for which setting is configured can be identified. The NAS SMC and AS SMC may be executed for the common NAS messages and AS messages. In this case, by setting all the values about S-NSSAI to zero, the messages can be identified to be common among the UE 40, the (R)AN 35, and the AMF 25.

Figure 10:
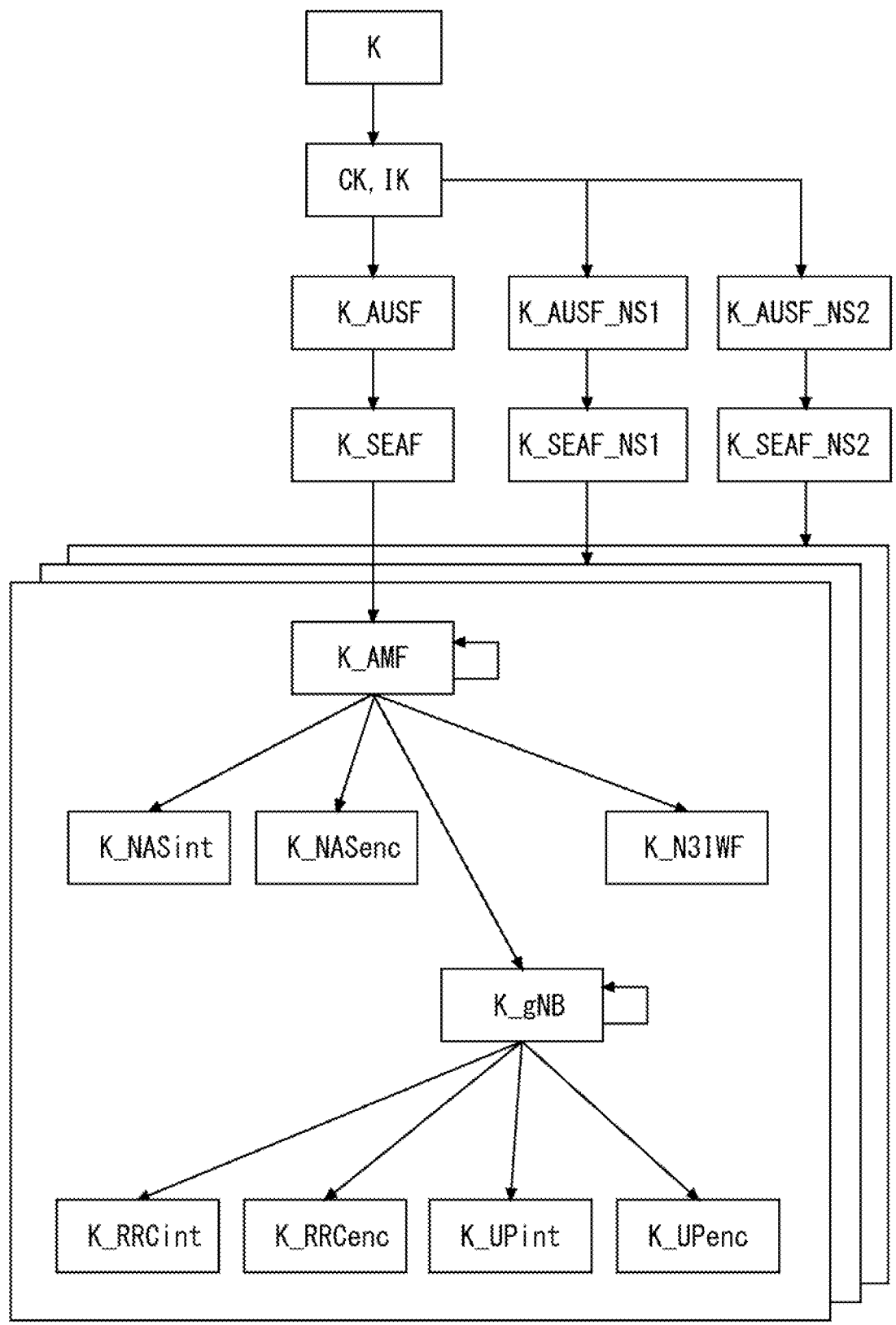
FIG. 10 shows a configuration of security keys generated between the UE and the core network device according to the second example embodiment.

Subsequently, referring to FIG. 10, security keys generated or derived between the UE 40, and the core network devices, such as the AMF 25, the AUSF 51 and the UDM 52 are described. Security key derivation may be executed in the message processing unit 21, or executed in a key generation unit provided in the core network device 20. A key CK (Cipher Key) and a key IK (Integrity Key) are derived from a security key K. Next, a security key K_AUSF independent of the network slice, and a security key K_AUSF_NS1 and a security key K_AUSF_NS2 for each network slice are derived from the key CK and the key IK. FIG. 10 shows that the security keys K_AUSF_NS1/NS2 used in two network slices are derived. However, the number of security keys to be derived is not limited to two.

Figure 11:
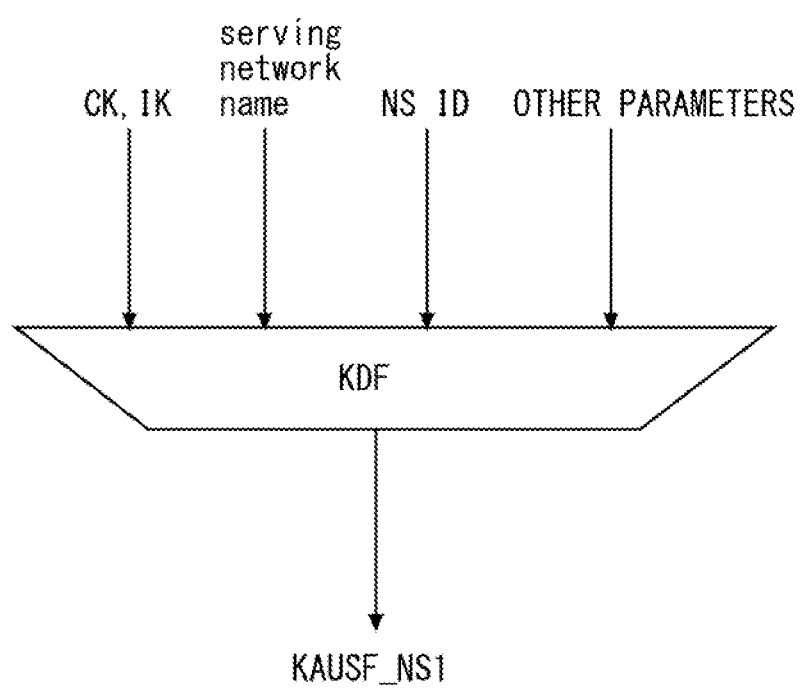
FIG. 11 illustrates derivation of a security key according to the second example embodiment.

Here, referring to FIG. 11, procedures of deriving the security keys K_AUSF_NS1 and K_AUSF_NS2 are described. FIG. 11 shows that a KDF (Key Delivery Function) is used as a key generation function. The CK, TK, serving network name, NS (Network Slice) ID, and another parameter are input into the KDF, thereby deriving K_AUSF_NS1 and K_AUSF_NS2 for each network slice. For example, an SST (Slice/Service type) or an SD (Slice Differentiator) included in the S-NSSAI may be used as the NS ID. When K_AUSF is derived, a predetermined value may be input into the NS ID. The other parameter may be identification information (ID) on the security profile, for example.

Returning to FIG. 10, security keys K_SEAF, K_SEAF_NS1 and K_SEAF_NS2 are derived from the security keys K_AUSF, K_AUSF_NS1 and K_AUSF_NS2, respectively. Furthermore, K_AMF is derived from the security key K_SEAF. Moreover, K_NASint, K_NASenc, K_gNB and K_N3IWF (Non-3GPP Interworking Function) are derived from the security key K_AMF. The security key K_NASint is used for integrity protection of the NAS message. The security key K_NASenc is used to encrypt the NAS message. The security key K_gNB is a security key used in the (R)AN 35. The security key K_N3IWF is a security key used in a communication terminal connected via an access network that is not defined by 3GPP. The access network that is not defined in 3GPP may be, for example, wireless LAN (Local Area Network).

Furthermore, security keys K_RRCint, K_RRCenc, K_UPint and K_UPent are derived from the security key K_gNB.

Likewise, also in the network slices 1 and 2, security keys are sequentially derived from K_SEAF_NS1.

Figure 12:
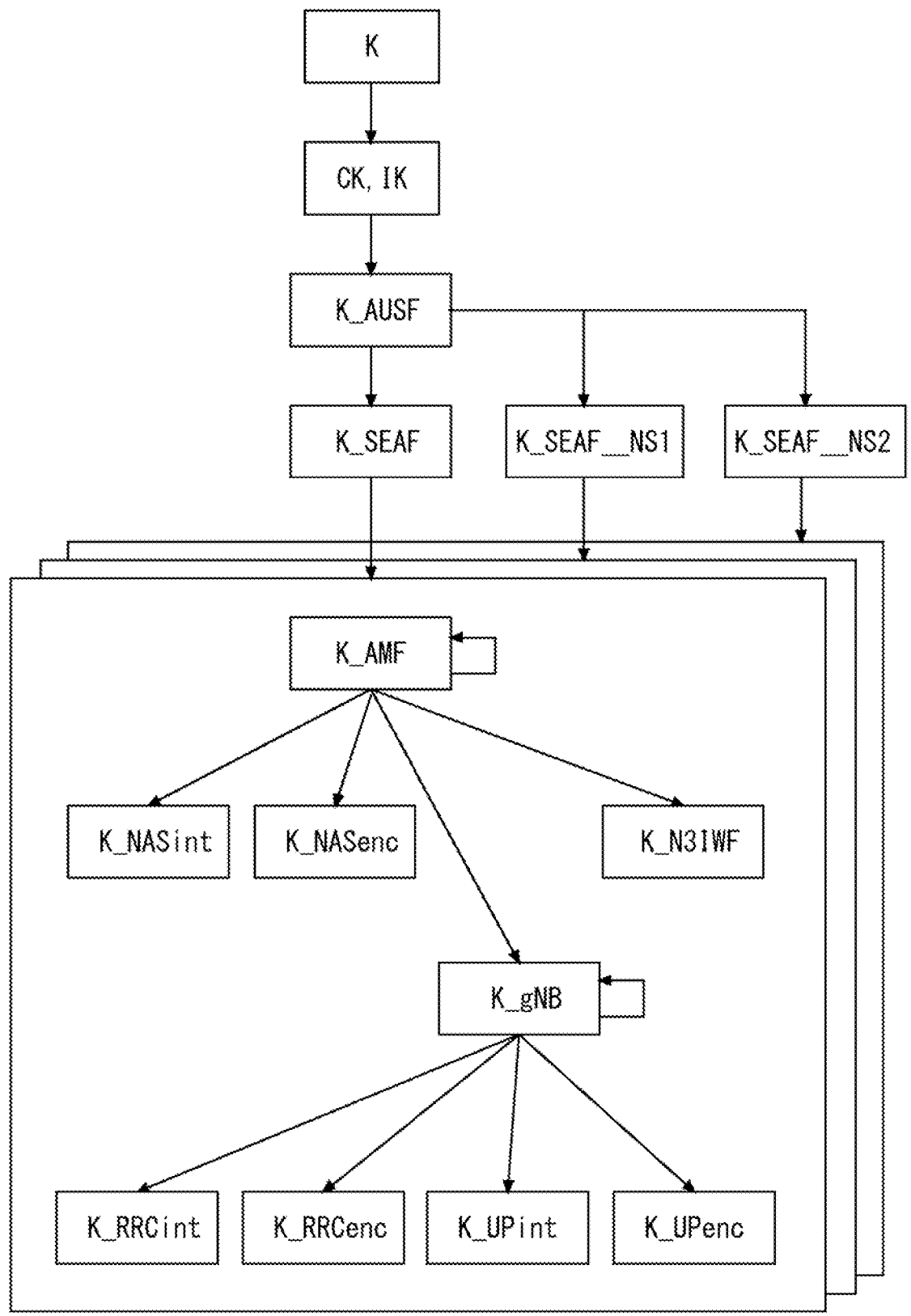
FIG. 12 shows a configuration of security keys generated between the UE and the core network device according to the second example embodiment.

Subsequently, referring to FIG. 12, security keys generated by generation procedures different from those in FIG. 10 are described. In FIG. 12, security keys K_SEAF, K_SEAF_NS1 and K_SEAF_NS2 are derived from the security key K_AUSF. That is, for deriving the security keys K_SEAF_NS1 and K_SEAF_NS2, the security key K_AUSF is used as an input of FIG. 11 instead of the keys CK and IK. Derivation of the security key hereafter is similar to that in FIG. 10. Accordingly, detailed description thereof is omitted.

In FIG. 10, the UDM 52 may derive the security keys K_AUSF, K_AUSF_NS1 and K_AUSF_NS2, while the AUSF 51 derives security keys K_SEAF, K_SEAF_NS1 and K_SEAF_NS2. Furthermore, the AMF 25 may derive K_AMF. In FIG. 12, the UDM 52 may derive the security key K_AUSF, while the AUSF 51 derives security keys K_SEAF, K_SEAF_NS1 and K_SEAF_NS2. Moreover, the AMF 25 may generate K_AMF.

Furthermore, in FIGS. 10 and 12, pluralities of security keys K_RRCint, K_RRCenc, K_UPint and K_UPent may be generated. For example, when copied user data is transmitted to multiple transfer paths, encryption using different security keys for the respective transfer paths can be achieved. Also on a single transfer path, encryption may be performed using multiple security keys. This allows use of slices requiring high secrecy, such as Public Safety Service or URLLC (Ultra-Reliable and Low Latency Communications). To generate multiple different keys, the keys may be respectively assigned numbers or identifiers (e.g., K_RRCint0=0, K_RRCint1=1, . . . ), which may be added to parameters to be input into the key generation function.

According to a method different from that in FIGS. 10 and 12, keys for the respective network slices may be generated from K_AMF and K_gNB. That is, K_NASint_NS1, K_NASenc_NS1, K_NASint_NS2 and K_NASenc_NS2 are generated from K_AMF. K_RRCint_NS1, K_RRCenc_NS1, K_UPint_NS1, K_UPenc_NS1, K_RRCint_NS2, K_RRCenc_NS2, K_UPint_NS2 and K_UPenc_NS2 are generated from K_gNB. Furthermore, pluralities of these keys may be generated.

As described above, use of the communication system according to the second example embodiment allows the AMF 25 to transmit, to the UE 40, identification information on the encryption algorithm and on integrity protection algorithm. The encryption algorithm and the integrity protection algorithm are security parameters associated with the network slices. Accordingly, in the communication system that includes the UE 40, the (R)AN 35, the AMF 25, the AUSF 51, and the UDM 52, security processes different among individual network slices can be executed.

Third Example Embodiment

Subsequently, referring to FIG. 13, procedures of identifying NAS messages in respective network slices in the AMF 25 are described. The UE 40 uses the security parameters defined for the respective network slices to perform a security process for the NAS message. In other words, the UE 40 performs encryption and integrity protection of the NAS messages using the algorithms for encryption and integrity protection designated by the NAS SMC. The NAS messages transmitted from the UE 40 is transmitted to the AMF 25. That is, all the NAS messages security-processed using the security parameters defined for the respective network slices are transmitted to the AMF 25. When the NAS messages are terminated, the AMF 25 transmits the control message to an SMF (Session Management Function) entity arranged in the network slice.

Here, to decrypt the encrypted NAS message, the AMF 25 is required to identify which network slice the NAS message corresponds to.

Figure 13:
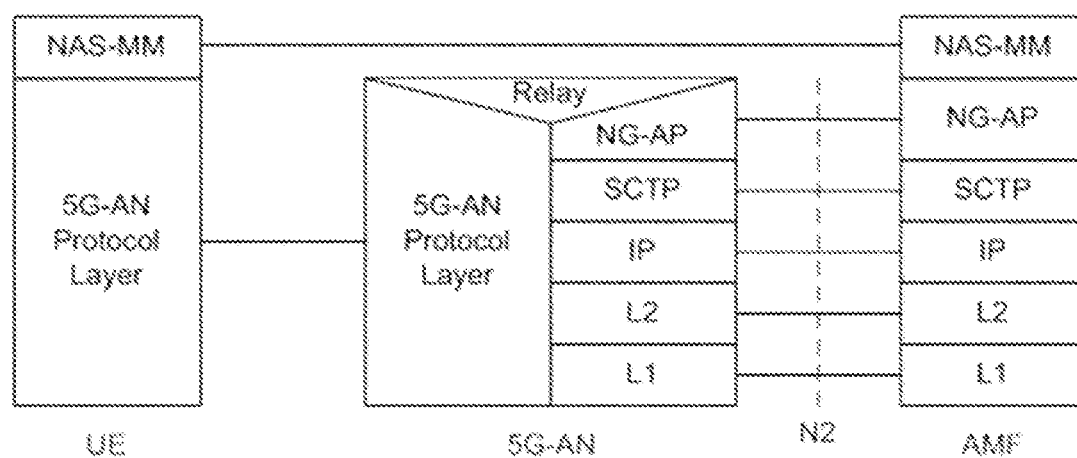
FIG. 13 illustrates a protocol stack in UE, (R)AN, and AMF according to a third example embodiment.

To notify the AMF 25 of the network slice to be used, the UE 40 includes the NSSAI in a message to be transmitted using a 5G-AN Protocol Layer shown in FIG. 13. The (R)AN 35 terminates the 5G-AN Protocol Layer. The 5G-AN in FIG. 13 corresponds to the (R)AN 35. The (R)AN 35 includes the NSSAI transmitted using the 5G-AN Protocol Layer, in a message to be transmitted using the NG-AP protocol. The message transmitted using the NG-AP protocol may be, for example, INITIAL UE MESSAGE. The (R)AN 35 transmits INITIAL UE MESSAGE to the AMF 25 via an N2 interface.

FIG. 14 shows that the NSSAI is added to INITIAL UE MESSAGE.

The NG-AP protocol is a protocol lower than the NAS protocol for generating the NAS message. Accordingly, INITIAL UE MESSAGE transmitted using the NG-AP protocol is not encrypted using the security parameters defined for the respective network slices. That is, INITIAL UE MESSAGE is not encrypted using the encryption algorithm for encrypting the NAS message.

Upon receipt of INITIAL UE MESSAGE, the AMF 25 recognizes that the encrypted NAS message corresponds to the network slice identified by the NSSAI included in INITIAL UE MESSAGE.

The AMF 25 decrypts the NAS message using 5G S-TMSI or GUAMI that is an identifier of the UE included in INITIAL UE MESSAGE, and the encryption algorithm associated with the network slice identified by the NSSAI.

As described above, the AMF 25 can receive the NSSAI included in the protocol on a lower layer of the NAS protocol. The message transmitted using the protocol on the lower layer of the NAS protocol is not encrypted using the algorithms defined for the respective network slices. Accordingly, the AMF 25 can identify the network slice corresponding to the encrypted NAS message.

Referring to FIGS. 13 and 14, notification about NSSAI to the AMF 25 by including the NSSAI in INITIAL UE MESSAGE has been described. Here, referring to FIG. 15, notification about information on the network slice to the AMF 25 using a procedure different from that in FIGS. 13 and 14 is described.

Figure 15:
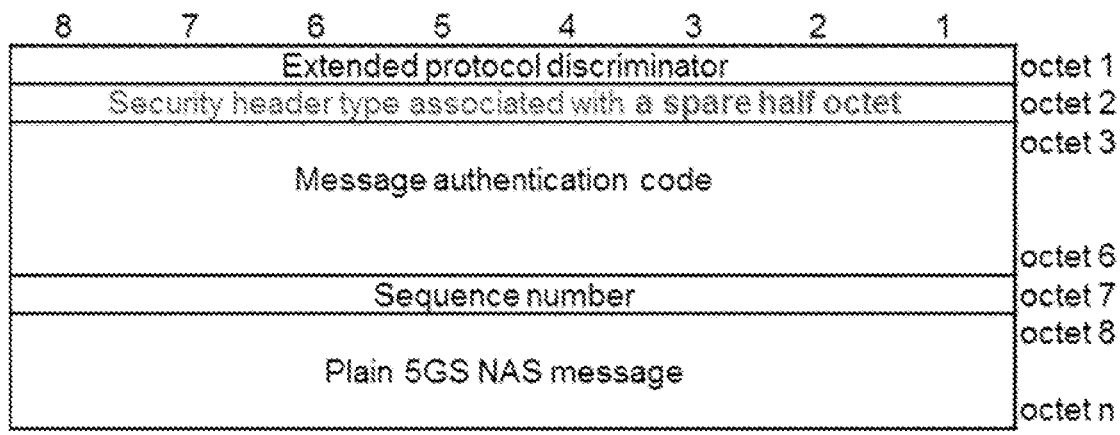
FIG. 15 shows a format of an NAS message according to the third example embodiment.

FIG. 15 shows the format of the NAS message. "Security header type associated with a spare half octet" field at octet 2 in FIG. 15 is a field that is not subjected to encryption using the algorithms defined for the respective network slices. That is, "Security header type associated with a spare half octet" field is a non-encryption area. Accordingly, the UE 40 sets information identifying the network slice, in "Security header type associated with a spare half octet" field of the NAS message, thereby notifying the AMF 25 of the network slice to be used.

FIG. 16 shows setting content of "Security header type associated with a spare half octet" field. As shown in FIG. 16, four bits among eight bits of "Security header type associated with a spare half octet" field are predetermined. Accordingly, information identifying the network slice is set in the remaining four bits of "Security header type associated with a spare half octet" field.

Figure 17:
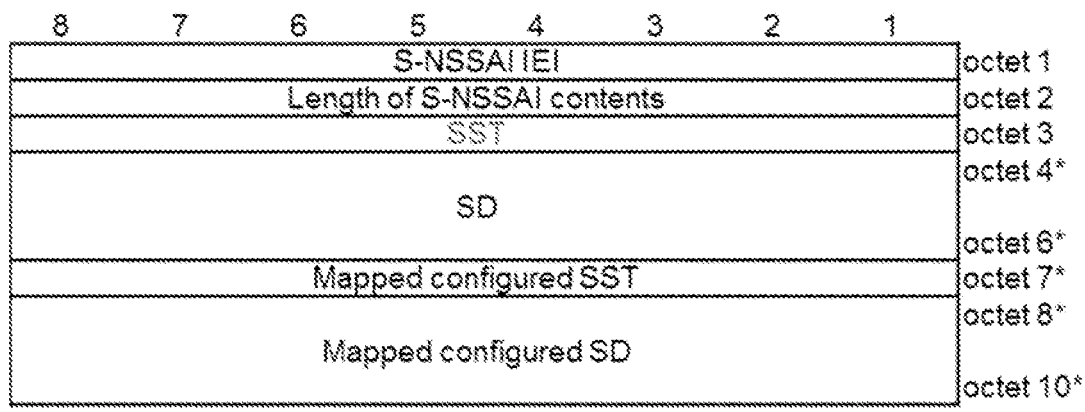
FIG. 17 shows a configuration of NSSAI according to the third example embodiment.

FIG. 17 shows the format of the NSSAI. As shown in FIG. 17, the NSSAI is indicated using a value having four or more bits. Accordingly, the NSSAI shown in FIG. 17 cannot be set, as it is, in the remaining four bits of "Security header type associated with a spare half octet" field. The UE 40 may then set information shown in FIG. 17 obtained by normalizing the NSSAI in four bits, in the remaining four bits of "Security header type associated with a spare half octet" field. The UE 40 may set information shown in FIG. 17 obtained by normalizing the eight bits indicated in the SST field of the NSSAI in four bits, in the remaining four bits of "Security header type associated with a spare half octet" field.

Alternatively, the UE 40 may set information obtained by normalizing the security parameter, such as of the encryption algorithm or the integrity protection algorithm for the NAS message, in the remaining four bits of "Security header type associated with a spare half octet" field.

The UE 40 can set information identifying the network slice, in "Security header type associated with a spare half octet" field that is an unencrypted field in the NAS message. Accordingly, the AMF 25 can identify which network slice the encrypted NAS message corresponds to.

Fourth Example Embodiment

Figure 18:
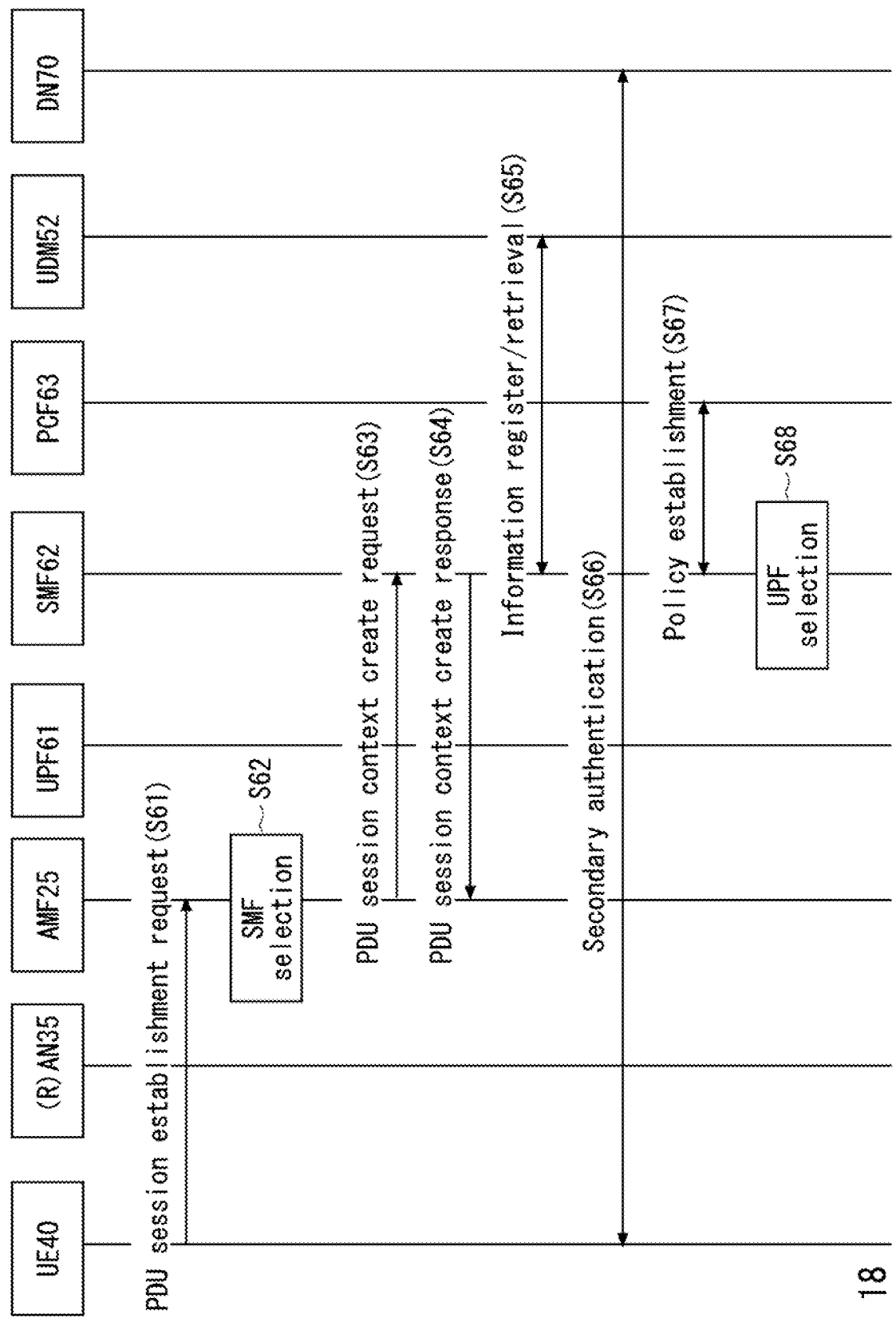
FIG. 18 shows a flow of a security process for user plane data according to a fourth example embodiment.
Figure 19:
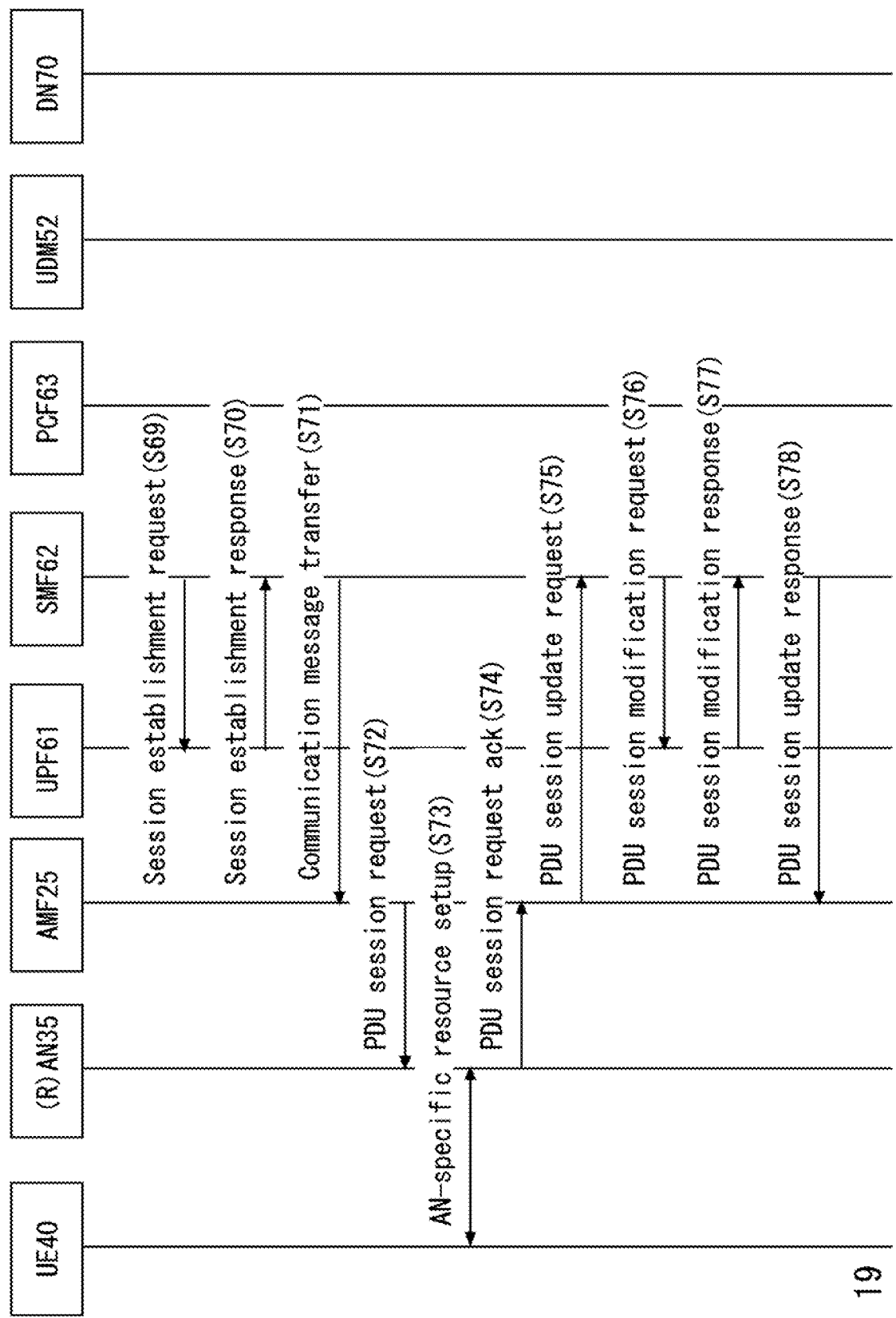
FIG. 19 shows a flow of a security process for user plane data according to the fourth example embodiment.

Subsequently, referring to FIGS. 18 and 19, procedures of executing a security process for the user plane data to be transferred between the UE 40 and the (R)AN 35 are described. FIGS. 18 and 19 show procedures of establishing a PDU session to be established between the UE 40 and the network slice (PDU session establishment). A UPF (User Plane Function) entity 61 (hereinafter called the UPF 61), and an SMF (Session Management Function) entity 62 (hereinafter called the SMF 62) are arranged in the network slice. The PCF (Policy Control Function) entity 63 (hereinafter called the PCF 63) may be arranged in the network slice, the serving network, or the home network.

The DN 70 is an external network connected using the network slice. The UPF 61 routes or transfers the user plane data between the UE 40 and the DN 70. The SMF 62 performs session managements about the UE 40. The session management includes establishment, change, and removal of sessions. The PCF 63 manages policy information about communication of the UE 40. Alternatively, the PCF 63 manages the policy information defined in the serving network or the home network.

First, the UE 40 transmits the PDU session establishment request to the AMF 25 (S61). Next, the AMF 25 selects an SMF (S62). It is herein assumed that the AMF 25 selects the SMF 62. Next, the AMF 25 transmits the PDU session context create request to the SMF 62 (S63). Next, the SMF 62 transmits the PDU session context create response to the AMF 25 (S64).

Next, the SMF 62 obtains subscriber information about the UE 40 from the UDM 52, if required, and furthermore, registers information about a PDU session in the UDM 52 (S65). Next, the UE 40 executes an authentication process for accessing the DN 70, between the UE 40 and the DN 70 (S66). The authentication process here is called secondary authentication.

Next, the SMF 62 obtains information about the policy from the PCF 63, if required, (S67). The information about the policy may include the security parameter about the network slice corresponding to the PDU session established by the UE 40. The security parameter may be, for example, information about activation of encryption and integrity protection, algorithms for encryption and integrity protection and the like.

Next, the SMF 62 selects a UPF for establishing a PDU session (S68). It is herein assumed that the SMF 62 selects the UPF 61. Next, the SMF 62 transmits a session establishment request to the UPF 61 (S69). Next, the UPF 61 transmits a session establishment response to the SMF 62 (S70). Next, the SMF 62 transmits a communication message including information about the PDU session and the like, to the AMF 25 (S71). The information about the PDU session may include the security parameter obtained in step S67.

Next, the AMF 25 transmits the PDU session request to the (R)AN 35 (S72). The PDU session request includes the security parameter obtained in step S67, and the NSSAI corresponding to the PDU session. The PDU session request may include the security profile associated with the NSSAI. Upon receipt of uplink data from the UE 40 using a DRB (Data Radio Bearer) set for the PDU session, the (R)AN 35 executes the security process using the NSSAI and the security parameter for the PDU session transmitted from the AMF 25.

Next, setting of a wireless section about the PDU session (AN-specific resource setup) is configured between the UE 40 and the (R)AN 35 (S73). The setting of the wireless section includes security activation for the user plane data (UP security activation). After the security activation has been completed, the UE 40 transmits, to the (R)AN 35, a message indicating that the security activation has been completed.

Next, the (R)AN 35 transmits a PDU session request ack to the AMF 25 (S74). Next, the AMF 25 transmits the PDU session update request to the SMF 62 (S75). Next, the SMF 62 transmits a PDU session modification request to the UPF 61 (S76). Next, the UPF 61 transmits a PDU session modification response to the SMF 62 (S77). Next, the SMF 62 transmits the PDU session update response to the AMF 25 (S78).

Figure 20:
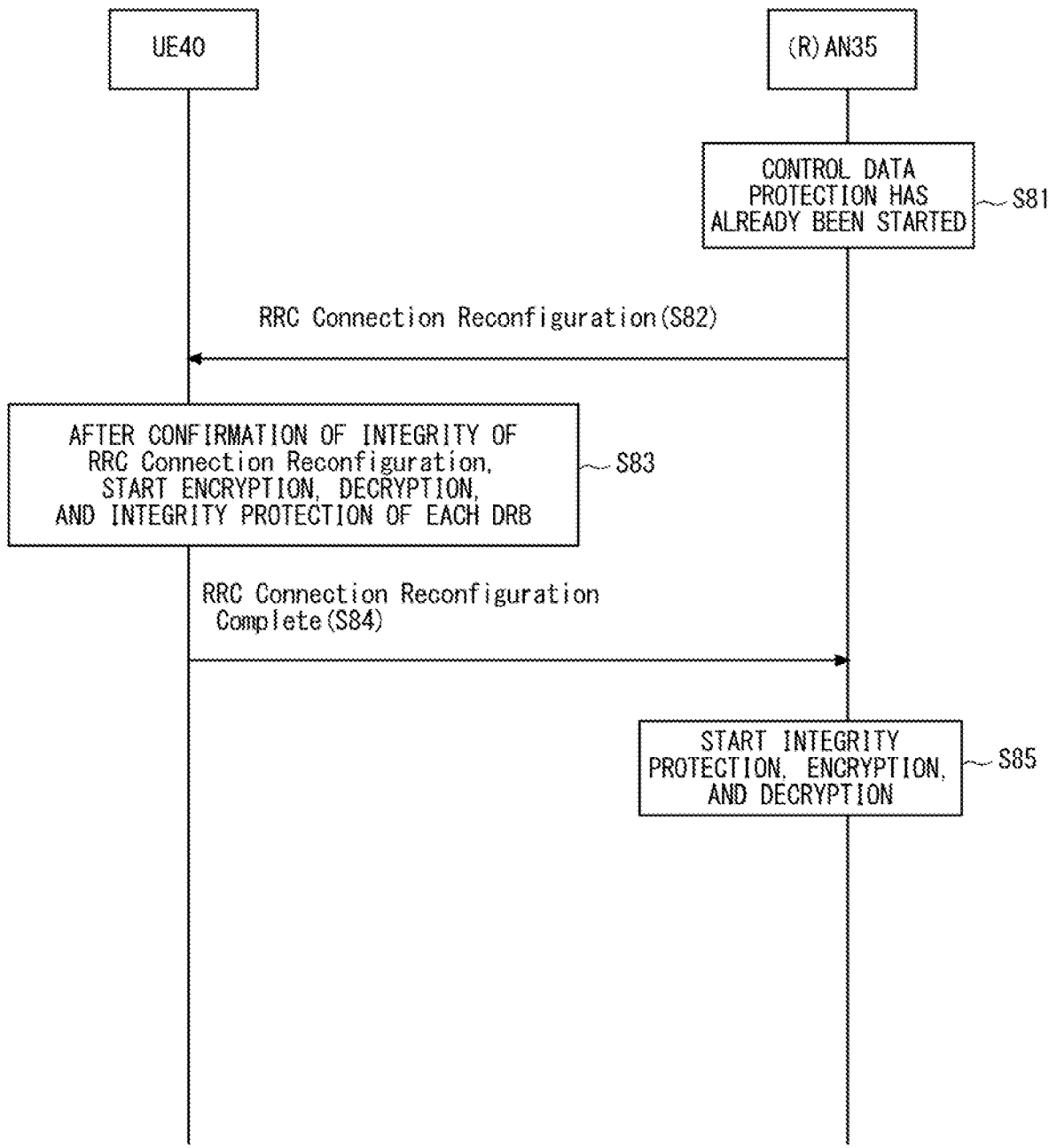
FIG. 20 shows the details of AN-specific resource setup according to the fourth example embodiment.

Subsequently, referring to FIG. 20, a detailed flow of the process in step S73 in FIG. 19 is described. In FIG. 20, security setting and activation are performed for the DRB (Data Radio Bearer) in the PDU session, on the basis of the policy information.

The policy information may be information notified from the PCF 63 when the PDU session in FIG. 19 is established. Alternatively, the (R)AN 35 may be preliminarily provided with information based on a local policy. FIG. 20 shows procedures of activating the security, on the basis of information on whether encryption and integrity protection included in the policy information are to be activated or not.

First, it is assumed that AS SMC has been completed, and protection of control data to be transferred between the UE 40 and the (R)AN 35 has been started (S81). The control data may be an RRC (Radio Resource Control) message. It is further assumed that information about the network slice to which the PDU session to be established belongs has been transmitted to the (R)AN 35. The (R)AN 35 may use an algorithm about the user plane data included in AS SMC. Alternatively, the (R)AN 35 may use the policy information obtained from the PCF 63 via the SMF 62, or obtain the security profile from the AMF 25.

Next, the (R)AN 35 transmits RRC Connection Reconfiguration to the UE 40 (S82). The RRC Connection Reconfiguration includes NSSAI indicating the network slice corresponding to the PDU session.

Next, the UE 40 confirms the integrity of the RRC Connection Reconfiguration (S83). If the UE 40 confirms that the integrity of the RRC Connection Reconfiguration has no problem, the UE 40 identifies the algorithms used on the network slice indicated by the NSSAI included in the RRC Connection Reconfiguration. Furthermore, the UE 40 uses the identified algorithms to start encryption of the user plane data to be transmitted, decryption of the received user plane data, and integrity protection of the user plane data to be transmitted and received (S83). The integrity protection means both confirmation of the integrity protection of the received user plane data, and assignment of a symbol for integrity protection to transmission user plane data.

Next, the UE 40 transmits RRC Connection Reconfiguration Complete to the (R)AN 35 (S84). Next, the (R)AN 35 uses the algorithms already determined in AS SMC to thereby start encryption of the user plane data to be transmitted, decryption of the received user plane data, and integrity protection of the user plane data to be transmitted and received (S85). The (R)AN 35 can perform security processes different among the individual PDU sessions, by storing the PDU session ID and the security setting of the PDU session ID. The security setting can be interchangeably called a security parameter.

FIGS. 19 and 20 thus show the procedures for establishing the PDU session. Also in a case where the UE 40 executes the service request, the security process for the user plane data can be executed using procedures similar to those in FIGS. 10 and 20. The service request is a process executed for activating a session having transitioned to an idle state after establishment of the PDU session.

As described above, execution of the processes according to the fourth example embodiment allows the UE 40 and the (R)AN 35 to execute the security process for the user plane data with respect to each network slice.

In each example embodiment, the UE 40 may notify a device arranged in the mobile network of whether the security setting can be performed or not with respect to each network slice. For example, an NS sec field may be defined in a UE network capability information element shown in FIG. 21. For example, setting of the NS sec to one may indicate that the UE 40 can set the security with respect to each network slice. Setting of the NS sec to zero or setting of the NS sec with no value may indicate that the security setting for each network slice cannot be allowed.

For example, the UE 40 may include the UE network capability information element, in a registration request for registration. The UE 40 may indicate whether or not security setting can be configured for each network slice, in an information element other than the UE network capability information element.

Figure 22:
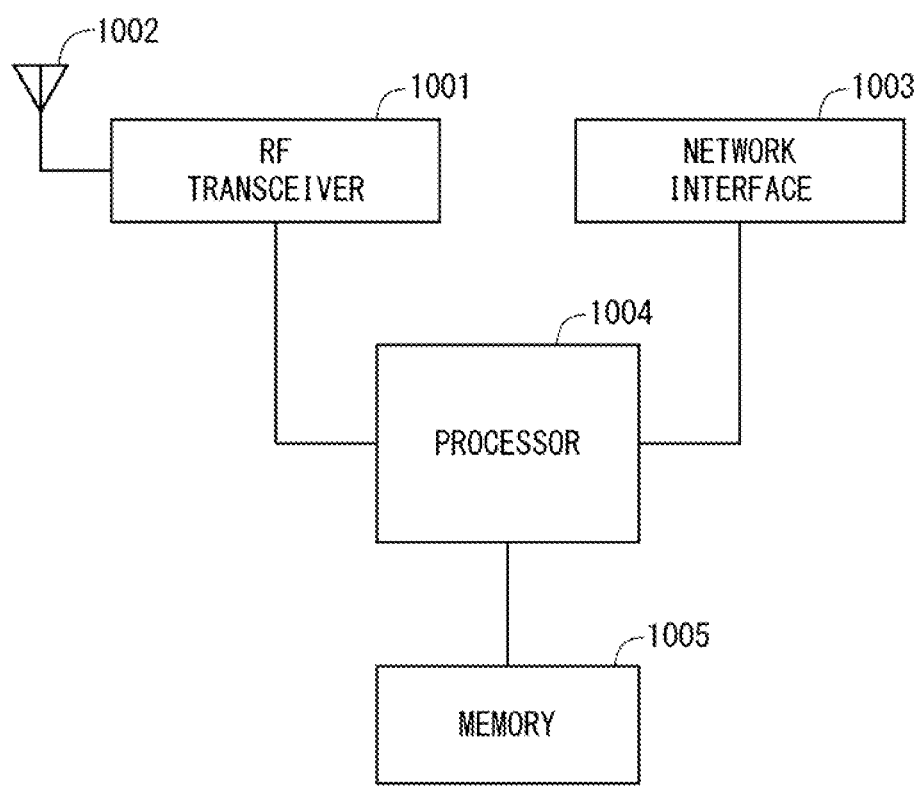
FIG. 22 is a configuration diagram of (R)AN according to each example embodiment.

The UE 40 notifies the AMF 25 of the capability of the UE 40 that indicates whether the UE 40 can configure security setting for each network slice or not, thereby allowing the AMF 25 to transfer the capability of the UE 40 to the (R)AN 35, the UPF 61, the SMF 62 and the like. Accordingly, over the entire 5G network, an integrated operation can be secured for the UE 40. As a method of notifying the AMF 25 of whether or not the security setting can be configured for each network slice, the UE 40 may use an existing NAS parameter, or newly set a new dedicated parameter and use this parameter. Subsequently, hereinafter, configuration examples of the (R)AN 35, the UE 40, the AMF 25, the AUSF 51, and the UDM 52 having been described in the aforementioned example embodiments are described. FIG. 22 shows a block diagram showing the configuration example of the (R)AN 35. Referring to FIG. 22, the (R)AN 35 includes an RF transceiver 1001, a network interface 1003, a processor 1004, and a memory 1005. The RF transceiver 1001 performs an analog RF signal processing for communicating with UEs. The RF transceiver 1001 may include multiple transceivers. The RF transceiver 1001 is coupled with the antenna 1002 and the processor 1004. The RF transceiver 1001 receives modulation symbol data (or OFDM symbol data) from the processor 1004, generates a transmission RF signal, and supplies the transmission RF signal to the antenna 1002. The RF transceiver 1001 generates a baseband reception signal on the basis of a received RF signal received by the antenna 1002, and supplies the signal to the processor 1004.

The network interface 1003 is used to communicate with a network node (e.g., another core network node). The network interface 1003 may include a network interface card (NIC) conforming to IEEE 802.3 series, for example.

The processor 1004 performs data plane processing that includes digital baseband signal processing for wireless communication, and control plane processing. For example, in cases of LTE and 5G, the digital baseband signal processing by the processor 1004 may include signal processing for a MAC layer and a PHY layer.

The processor 1004 may include multiple processors. For example, the processor 1004 may include a modem processor (e.g., DSP) that performs the digital baseband signal processing, and a protocol stack processor (e.g., a CPU or an MPU) that performs the control plane processing.

The memory 1005 includes a combination of a volatile memory and a nonvolatile memory. The memory 1005 may include multiple memory devices that are physically independent. The volatile memory may be, for example, a static random access memory (SRAM) or a dynamic RAM (DRAM), or a combination thereof. The nonvolatile memory may be a mask read only memory (MROM), an electrically erasable programmable ROM (EEPROM), a flash memory or a hard disk drive, or any combination thereof. The memory 1005 may include a storage arranged apart from the processor 1004. In this case, the processor 1004 may access the memory 1005 via the network interface 1003 or an I/O interface, not shown.

The memory 1005 may store software modules (computer programs) including data and instructions for performing processes by the (R)AN 35 described by the aforementioned multiple example embodiments. In some implementations, the processor 1004 may be configured to perform the processes of the (R)AN 35 described in the aforementioned example embodiments, by reading the software modules from the memory 1005 and executing the modules.

Figure 23:
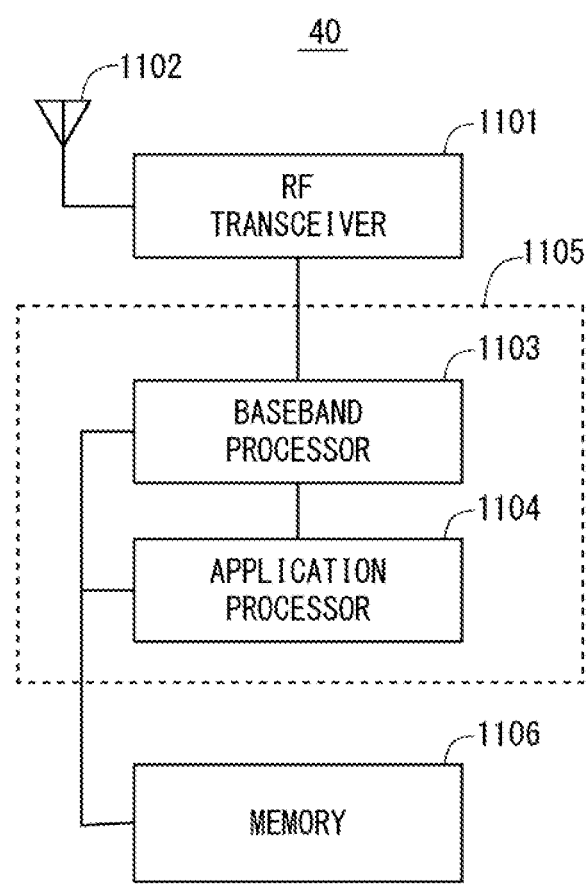
FIG. 23 is a configuration diagram of UE according to each example embodiment.

FIG. 23 shows a block diagram showing the configuration example of the UE 40. A radio frequency (RF) transceiver 1101 performs analog RF signal processing for communicating with the (R)AN 35. The analog RF signal processing performed by the RF transceiver 1101 includes frequency up-conversion, frequency down-conversion, and amplification. The RF transceiver 1101 is coupled with an antenna 1102 and a baseband processor 1103. That is, the RF transceiver 1101 receives modulation symbol data (or OFDM symbol data) from the baseband processor 1103, generates a transmission RF signal, and supplies the transmission RF signal to the antenna 1102. The RF transceiver 1101 generates baseband reception signal on the basis of a received RF signal received by the antenna 1102, and supplies the signal to the baseband processor 1103.

The baseband processor 1103 performs digital baseband signal processing for wireless communication (data plane processing), and control plane processing. The digital baseband signal processing includes (a) data compression/decompression, (b) data segmentation/concatenation, and (c) transfer format (transfer frame) generation/decomposition. Furthermore, the digital baseband signal processing includes (d) transfer path encoding/decoding, (e) modulation (symbol mapping)/demodulation, and (f) OFDM symbol data (baseband OFDM signal) generation by the inverse fast Fourier transform (IFFT). On the other hand, the control plane processing includes communication management of a layer 1 (e.g., transmission power control), a layer 2 (e.g., wireless resource management, and a hybrid automatic repeat request (HARQ) process), and a layer 3 (e.g., signaling about attach, mobility, and communication management).

For example, in cases of LTE and 5G, the digital baseband signal processing by the baseband processor 1103 may include signal processing on a Packet Data Convergence Protocol (PDCP) layer, a Radio Link Control (RLC) layer, a MAC layer, and a PHY layer. The control plane processing by the baseband processor 1103 may include processes of a Non-Access Stratum (NAS) protocol, an RRC protocol, and a MAC CE.

The baseband processor 1103 may include a modem processor (e.g., a digital signal processor (DSP)) that performs the digital baseband signal processing and a protocol stack processor (e.g., a central processing unit (CPU) that performs the control plane processing, or a micro processing unit (MPU)). In this case, the protocol stack processor that performs the control plane processing may be commonalized with an application processor 1104 described later.

The application processor 1104 is also called a CPU, an MPU, a microprocessor, or a processor core. The application processor 1104 may include multiple processors (multiple processor cores). The application processor 1104 achieves various functions of the UE 40 by executing a system software program (Operating System (OS)) and various application programs read from a memory 1106 or a memory, not shown. The application program may be, for example, a call application, a web browser, a mailer, a camera operation application, or a music playback application.

In some implementations, as shown by broken lines (1105) in FIG. 23, the baseband processor 1103 and the application processor 1104 may be integrated on a single chip. In other words, the baseband processor 1103 and the application processor 1104 may be implemented as a single system on chip (SoC) device 1105. The SoC device may be sometimes called a system large scale integration (LSI) or chipset.

The memory 1106 is a volatile memory or a nonvolatile memory, or a combination thereof. The memory 1106 may include multiple memory devices that are physically independent. The volatile memory may be, for example, a static random access memory (SRAM) or a dynamic RAM (DRAM), or a combination thereof. The nonvolatile memory may be a mask read only memory (MROM), an electrically erasable programmable ROM (EEPROM), a flash memory or a hard disk drive, or any combination thereof. For example, the memory 1106 may include an external memory device accessible from the baseband processor 1103, the application processor 1104, and the SoC 1105. The memory 1106 may include a built-in memory device integrated in the baseband processor 1103, the application processor 1104, or the SoC 1105. Furthermore, the memory 1106 may include a memory in a universal integrated circuit card (UICC).

The memory 1106 may store software modules (computer programs) including instructions and data for performing the processes by the UE 40 described in the aforementioned multiple example embodiments. In some implementations, the baseband processor 1103 or the application processor 1104 may be configured to perform the processes of the UE 40 described in the aforementioned example embodiments by reading the software modules from the memory 1106 and executing the modules.

Figure 24:
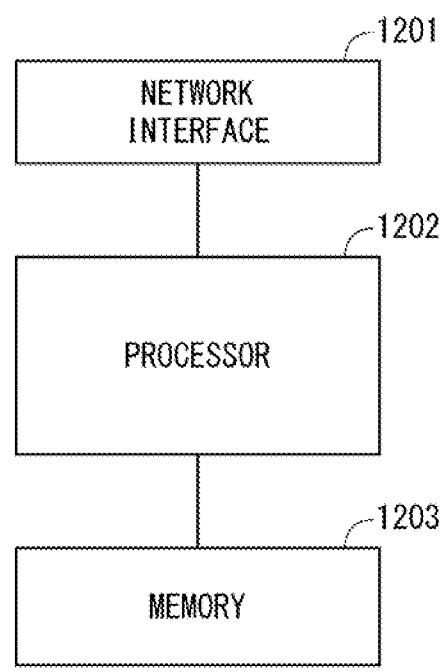
FIG. 24 is a configuration diagram of a core network device according to each example embodiment.

FIG. 24 is a block diagram showing a configuration example of the core network device 10, such as the AMF 25, the AUSF 51, or the UDM 52. Referring to FIG. 24, the core network device 10 includes a network interface 1201, a processor 1202, and a memory 1203. The network interface 1201 is used to communicate with another network node that constitutes the communication system. The network interface 1201 may include a network interface card (NIC) conforming to IEEE 802.3 series, for example.

The processor 1202 performs the processes of the core network device 10 described using the sequence diagrams and flowcharts in the aforementioned example embodiments, by reading the software (computer program) from the memory 1203 and executing the software. The processor 1202 may be, for example, a microprocessor, an MPU (Micro Processing Unit), or a CPU (Central Processing Unit). The processor 1202 may include multiple processors.

The memory 1203 includes a combination of a volatile memory and a nonvolatile memory. The memory 1203 may include a storage arranged apart from the processor 1202. In this case, the processor 1202 may access the memory 1203 via an I/O interface, not shown.

In the example in FIG. 24, the memory 1203 is used to store software modules. The processor 1202 performs the processes of the core network device 10 described in the aforementioned example embodiments, by reading the software modules from the memory 1203 and executing the modules.

As described with reference to FIG. 24, each processor included in the core network device 10 executes one or more programs including instructions for causing the computer to perform the algorithms described with reference to the drawings.

In the example described above, the programs are stored using various types of non-transitory computer-readable media, and can be supplied to the computer. The non-transitory computer-readable media may include tangible storage media that have various substantial entities. Examples of the non-transitory computer-readable media include a magnetic recording medium, an magnetooptical recording medium (e.g., a magnetooptical disk), a CD-ROM (Read Only Memory), a CD-R, a CD-R/W, a semiconductor memory, a flash ROM, and a RAM (Random Access Memory)). The magnetic recording medium may be, for example, a flexible disk, magnetic tape, or a hard disk drive. The semiconductor memory may be, for example, a mask ROM, a PROM (Programmable ROM), an EPROM (Erasable PROM), a flash ROM, or a RAM (Random Access Memory). The programs may be supplied to the computer through various types of non-transitory computer readable media. Examples of transitory computer readable media include electric signals, optical signals, and electromagnetic waves. The transitory computer readable media can supply programs to the computer via a wired communication path, such as an electric line and an optical fiber, or a wireless communication path.

The communication terminal, the user terminal (user equipment: UE) (or including a mobile station, a mobile terminal, a mobile device, or a wireless terminal (wireless device)) in this Description are entities connected to the network via wireless interfaces.

The UE in this Description is not limited to a dedicated communication device, and may be any of the following devices that have a communication function as that of the UE described in this Description.

As for terms, "user terminal (user equipment: UE) (as a term used in 3GPP)", "mobile station", "mobile terminal", "mobile device", and "wireless terminal" are generally intended to have the same meaning, and may be a standalone mobile station, such as a terminal, a mobile phone, a smartphone, a tablet, a cellular IoT terminal, or an IoT device.

It should be understood that "UE" and "wireless terminal" as terms also encompass devices remaining still for a long time.

The UE may be, for example, production facilities, manufacturing facilities, and/or energy related machines (e.g., boilers, engines, turbines, solar panels, wind power generators, hydrogenerators, thermal power generators, nuclear generators, rechargeable batteries, nuclear power systems, nuclear related devices, heavy electric machines, pumps including vacuum pumps, compressors, fans, blowers, hydraulic machines, pneumatic machines, metal processing machines, manipulators, robots, robot applied systems, tools, molds, rolls, conveyance devices, elevator devices, cargo handling devices, textile machines, sewing machines, printers, printing related machines, paper processing machines, chemical machines, mining machines, mine related machines, construction machines, construction related machines, agricultural machines and/or instruments, forestry machines and/or instruments, fishing machines and/or instruments, security and/or environment conservation instruments, tractors, bearings, precision bearing, chains, gears, power transmission devices, lubrication devices, valves, pipe fittings, and/or an application system or the like of any of the devices or machines described above).

The UE may be, for example, any of apparatuses for transportation (e.g., vehicles, automobiles, motorcycles, bicycles, trains, buses, two-wheel carts, rickshaws, vessels (ships and other watercrafts), aircraft, rockets, artificial satellites, drones, balloons, and the like.

The UE may be, for example, any of devices for information communication (for example, electronic computers and related devices, communication devices and related devices, electronic components, etc.)

The UE may be, for example, any of refrigeration machines, refrigeration applied products and devices, devices for commerce and services, automatic vending machines, automatic service machines, office machines and devices, commercial electric and electronic machine instruments (for example, audio devices, speakers, radios, video devices, televisions, oven ranges, rice cookers, coffee makers, dishwashers, washing machines, dryers, electric fans, ventilating fans and related produces, cleaners, etc.).

The UE may be, for example, any of electronic applied systems or electronic applied devices (for example, X-ray devices, particle accelerator devices, radioactive material applied devices, acoustic wave applied devices, electromagnetic applied devices, electric power applied devices, etc.).

The UE may be, for example, any of light bulbs, illumination lamps, weighing machines, analytical instruments, testing machines, measurement machines (e.g., smoke alarms, human detection alarm sensors, motion sensors, wireless tags, etc.) timepieces (watches or clocks), physical and chemical machines, optical machines, medical devices and/or medical systems, arms, cutlery and craftsmen tools, or hand tools, etc.

The UE may be, for example, any of personal digital assistants or devices having a wireless communication function (for example, electronic devices (e.g., personal computers, electronic measuring instruments) configured to allow wireless cards, wireless modules or the like to be attached thereto or to be inserted thereinto).

The UE may be, for example, any of devices or some or a part thereof that provide the following applications, services, and solutions in "(IoT: Internet of Things)" using wired or wireless communication technologies.

IoT devices (or things) includes appropriate electronic devices, software, sensors, and network connections that allow devices to collect data from and exchange data with each other and other communication devices.

The IoT devices may be automated devices subjected to software instructions stored in internal memories.

The IoT devices may operate without any need of management or support by a person. The IoT devices may be devices furnished for a long time period, and/or may be left in an inactive state for a long time period.

The IoT devices can be implemented as parts of stationary devices. The IoT devices can be implemented in non-stationary devices (e.g., vehicles etc.), or can be attached to animals or people to be monitored/tracked.

It can be understood that the IoT technology can be implemented in any communication device connectable to a communication network that transmits and receives data irrespective of control by human inputs or software instructions stored in memories.

It can be understood that the IoT devices are also sometimes called machine type communication (MTC) devices, or machine to machine (M2M) communication devices, or NB-IoT (Narrow Band-IoT) UE.

It can be understood that the UE can support one or more IoTs or MTC applications.

Some examples of MTC applications are listed in the following table (reference: 3GPP TS22.368 V13.2.0 (2017 Jan. 13) Annex B, the content of which is incorporated by reference in this Description). This list is not exhaustive, but shows MTC applications as an example.

| Service range | MTC application |
| --- | --- |
| Security | Monitoring system |
|  | Backup of fixed-line phone |
|  | Physical access control (e.g., access to building) |
|  | Car/driver security |
| Tracking & Tracing | Fleet Management |
|  | Order management |
|  | Telematics insurance: Pay as you drive (PAYD) |
|  | Asset management |
|  | Navigation |
|  | Traffic information |
|  | Road tolling |
|  | Road traffic optimization/steering |
| Payment | Point of sales: POS |

| Service range | MTC application |
| --- | --- |
| | Vending machines |
| | Gaming machines |
| Health | Monitoring vital signs |
| | Supporting the aged or handicapped |
| | Web Access Telemedicine points |
| | Remote diagnostics |
| Remote | Sensors |
| Maintenance/ | Lighting |
| Control | Pumps |
| | Valves |
| | Elevator control |
| | Vending machine control |
| | Vehicle diagnostics |
| Metering | Power |
| | Gas |
| | Water |
| | Heating |
| | Grid control |
| | Industrial metering |
| Consumer Devices | Digital photo frame |
| | Digital camera |
| | Electronic book |

The applications, services and solutions may be, for example, MVNO (Mobile Virtual Network Operator) services/systems, disaster warning wireless services/systems, premise radio phone (PBX (Private Branch eXchange)) services/systems, PHS/digital cordless phones services/systems, POS (Point of Sale) systems, advertisement delivery services/systems, multicast (MBMS (Multimedia Broadcast and Multicast Service)) services/systems, V2X (Vehicle to Everything: intervehicle communication and road-to-vehicle and pedestrian-to-vehicle communication) services/systems, intra-train mobile wireless services/systems, position information related services/systems, disaster/emergency wireless communication services/systems, IoT (Internet of Things) services/systems, community services/systems, video distribution services/systems, Femtocell applied services/systems, VoLTE (Voice over LTE) services/systems, wireless TAG services/systems, billing services/systems, radio on demand services/systems, roaming services/systems, user behavior monitoring services/systems, communication carrier/communication NW selection services/systems, function limitation services/systems, PoC (Proof of Concept) services/systems, terminal-dedicated personal information management services/systems, terminal-dedicated display and video services/systems, non-communication services/systems for terminals, ad-hoc NW/DTN (Delay Tolerant Networking) services/systems, etc.

Note that the categories of UE described above are only application examples of the technical thought and example embodiments described in this Description. There is no limitation to these examples. It is a matter of course that those skilled in the art can make various changes.

Note that the present disclosure is not limited to the example embodiments described above, and can be appropriately changed in a range without departing from the gist.

The invention of the present application has thus been described above with reference to the example embodiments. However, the invention of the present application is not limited by the above description. The configuration and details of the invention of the present application can be subjected to various changes that can be understood by those skilled in the art within the scope of the invention.

This application claims the priority based on Japanese Patent Application No. 2018-164410 filed Sep. 3, 2018, disclosure of which is incorporated by reference in its entirety.

A part or all of the example embodiments described above can be described as the following supplementary notes. However, there is no limitation to the followings.

(Supplementary Note 1)

A core network device comprising:
   a storage unit configured to store a security parameter associated with a network slice allowing a communication terminal; and
a communication unit configured to transmit identification information on the network slice, and identification information on the security parameter, to the communication terminal.

(Supplementary Note 2)

The core network device according to Supplementary note 1, wherein, in a procedure of registering the communication terminal in the core network device, the communication unit includes the identification information on the network slice and the identification information on the security parameter in an NAS security mode command message to be transmitted to the communication terminal.

(Supplementary Note 3)

The core network device according to Supplementary note 1 or 2, wherein the storage unit stores identification information on the network slice allowing the communication terminal, and the security parameter that have been transmitted from a subscriber information management device that stores subscriber information on the communication terminal.

(Supplementary Note 4)

The core network device according to any one of Supplementary notes 1 to 3 further comprising:
   a key generation unit configured to generate a security key associated with the network slice.

(Supplementary Note 5)

The core network device according to any one of Supplementary notes 1 to 4,
   wherein the communication unit receives an NAS message encrypted using the security parameter, and the identification information on the network slice corresponding to the NAS message, and
   the core network device further comprises a message processing unit configured to decrypt the NAS message using the security parameter associated with the identification information on the network slice.

(Supplementary Note 6)

The core network device according to Supplementary note 5, wherein the identification information on the network slice is set in a message to be processed using a protocol lower than a protocol for processing the NAS message.

(Supplementary Note 7)

The core network device according to Supplementary note 5, wherein the identification information on the network slice is set in a non-encryption area in the NAS message.

(Supplementary Note 8)

An access network device comprising:
   a communication unit configured to receive identification information on a security parameter associated with a network slice allowing a communication terminal and identification information on the network slice, and transmit the identification information on the security parameter and the identification information on the network slice to the communication terminal.

(Supplementary Note 9)

The access network device according to Supplementary note 8, wherein the communication unit includes the identification information on the security parameter and the identification information on the network slice in an AS Security Mode Command message to be transmitted to the communication terminal in a procedure of registering the communication terminal in a core network device.

(Supplementary Note 10)

The access network device according to Supplementary note 8, wherein, in PDU session establishment to be executed when the communication terminal starts communication using the network slice, the communication unit receives the identification information on the network slice, and to includes the identification information on the network slice in an RRC Connection Reconfiguration message.

(Supplementary Note 11)

The access network device according to Supplementary note 8 or 10, wherein, in a service request to be executed when the communication terminal starts communication using the network slice, the communication unit receives the identification information on the network slice from a core network device, and to transmit, to the communication terminal, a message subjected to security setting using the security parameter associated with the identification information on the network slice.

(Supplementary Note 12)

A communication terminal comprising:
  a storage unit configured to store a security parameter associated with a network slice allowing the communication terminal; and
  a communication unit configured to receive identification information on the network slice, and identification information on the security parameter.

(Supplementary Note 13)

The communication terminal according to Supplementary note 12, wherein, for communication using the network slice, the communication unit transmits a message subjected to security setting using the security parameter identified according to the identification information on the security parameter.

(Supplementary Note 14)

The communication terminal according to Supplementary note 12 or 13, wherein the communication unit transmits the identification information on the network slice, and an NAS message encrypted using the security parameter associated with the network slice.

(Supplementary Note 15)

The communication terminal according to Supplementary note 14, wherein the communication unit sets the identification information on the network slice in a message to be processed using a protocol terminated at an access network device.

(Supplementary Note 16)

A communication system comprising:
  a core network device that comprises a first storage unit configured to store a security parameter associated with a network slice allowing a communication terminal, and a first communication unit configured to transmit identification information on the network slice, and identification information on the security parameter, to the communication terminal; and
  the communication terminal that comprises a second storage unit configured to store the security parameter, and a second communication unit configured to receive the identification information on the network slice, and the identification information on the security parameter.

(Supplementary Note 17)

The communication system according to Supplementary note 16, wherein, in a procedure of registering the communication terminal in the core network device, the first communication unit includes the identification information on the network slice and the identification information on the security parameter in an NAS Security Mode Command message to be transmitted to the communication terminal.

(Supplementary Note 18)

A communication method performed by a core network device, the communication method comprising:
  storing a security parameter associated with a network slice allowing a communication terminal; and
  transmitting identification information on the network slice, and identification information on the security parameter, to the communication terminal.

(Supplementary Note 19)

A communication method performed by an access network device, the communication method comprising:
  receiving identification information on a security parameter associated with a network slice allowing a communication terminal, and on the network slice; and
  transmitting the identification information on the security parameter, and the identification information on the network slice, to the communication terminal.

(Supplementary Note 20)

A communication method performed by a communication terminal, the communication method comprising:
  storing a security parameter associated with a network slice allowing the communication terminal; and
  receiving identification information on the network slice, and identification information on the security parameter.

REFERENCE SIGNS LIST

10 Core network device
11 Storage unit
12 Communication unit
20 Core network device
21 Message processing unit
25 AMF
30 Access network device
31 Storage unit
32 Communication unit
33 Message processing unit
35 (R)AN
40 UE
41 Storage unit
42 Communication unit
43 Message processing unit
51 AUSF
52 UDM
61 UPF
62 SMF
63 PCF
70 DN

The invention claimed is:

1. A core network device comprising:
  at least one memory storing instructions; and
  at least one processor configured to execute the instructions to:
    store a security parameter associated with a network slice allowing a communication terminal;
    transmit identification information on the network slice, and identification information on the security parameter, to the communication terminal;

receive an NAS message encrypted using the security parameter, and the identification information on the network slice corresponding to the NAS message; and decrypt the NAS message using the security parameter associated with the identification information on the network slice, wherein the identification information on the network slice is set in a message to be processed using a protocol lower than a protocol for processing the NAS message.

2. The core network device according to claim 1, wherein, in a procedure of registering the communication terminal in the core network device, the at least one processor is further configured to execute the instructions to include the identification information on the network slice and the identification information on the security parameter in an NAS security mode command message to be transmitted to the communication terminal.

3. The core network device according to claim 2, wherein the at least one processor is further configured to execute the instructions to:

receive an NAS message encrypted using the security parameter, and the identification information on the network slice corresponding to the NAS message; and decrypt the NAS message using the security parameter associated with the identification information on the network slice, and wherein the identification information on the network slice is set in a message to be processed using a protocol lower than a protocol for processing the NAS message.

4. The core network device according to claim 2, wherein the at least one processor is further configured to execute the instructions to:

receive an NAS message encrypted using the security parameter, and the identification information on the network slice corresponding to the NAS message; and decrypt the NAS message using the security parameter associated with the identification information on the network slice, and wherein the identification information on the network slice is set in a non-encryption area in the NAS message.

5. The core network device according to claim 1, wherein the at least one processor is further configured to execute the instructions to:

store identification information on the network slice allowing the communication terminal, and the security parameter that have been transmitted from a subscriber information management device that stores subscriber information on the communication terminal.

6. The core network device according to claim 5, wherein the at least one processor is further configured to execute the instructions to:

receive an NAS message encrypted using the security parameter, and the identification information on the network slice corresponding to the NAS message; and decrypt the NAS message using the security parameter associated with the identification information on the network slice, and wherein the identification information on the network slice is set in a message to be processed using a protocol lower than a protocol for processing the NAS message.

7. The core network device according to claim 5, wherein the at least one processor is further configured to execute the instructions to:

receive an NAS message encrypted using the security parameter, and the identification information on the network slice corresponding to the NAS message; and decrypt the NAS message using the security parameter associated with the identification information on the network slice, and wherein the identification information on the network slice is set in a non-encryption area in the NAS message.

8. The core network device according to claim 1, wherein the at least one processor is further configured to execute the instructions to:

generate a security key associated with the network slice.

9. The core network device according to claim 8, wherein the at least one processor is further configured to execute the instructions to:

receive an NAS message encrypted using the security parameter, and the identification information on the network slice corresponding to the NAS message; and decrypt the NAS message using the security parameter associated with the identification information on the network slice, and wherein the identification information on the network slice is set in a message to be processed using a protocol lower than a protocol for processing the NAS message.

10. The core network device according to claim 8, wherein the at least one processor is further configured to execute the instructions to:

receive an NAS message encrypted using the security parameter, and the identification information on the network slice corresponding to the NAS message; and decrypt the NAS message using the security parameter associated with the identification information on the network slice, and wherein the identification information on the network slice is set in a non-encryption area in the NAS message.

11. The core network device according to claim 1, wherein the identification information on the network slice is set in a non-encryption area in the NAS message.

12. A communication terminal comprising:
at least one memory storing instructions; and
at least one processor configured to execute the instructions to:
store a security parameter associated with a network slice allowing the communication terminal;
receive identification information on the network slice, and identification information on the security parameter; and
transmit the identification information on the network slice, and an NAS message encrypted using the security parameter associated with the network slice,
wherein the identification information on the network slice is set in a message to be processed using a protocol lower than a protocol for processing the NAS message.

13. The communication terminal according to claim 12, wherein, for communication using the network slice, the at least one processor is configured to execute the instructions to:

transmit a message subjected to security setting using the security parameter identified according to the identification information on the security parameter.

14. The communication terminal according to claim 13, wherein the at least one processor is configured to execute the instructions to:
  transmit the identification information on the network slice, and an NAS message encrypted using the security parameter associated with the network slice.

15. The communication terminal according to claim 14, wherein the at least one processor is configured to execute the instructions to:
  set the identification information on the network slice in a message to be processed using a protocol terminated at an access network device.

16. The communication terminal according to claim 12, wherein the at least one processor is configured to execute the instructions to:
  set the identification information on the network slice in a message to be processed using a protocol terminated at an access network device.

17. A communication method performed by a core network device, the communication method comprising:
  storing a security parameter associated with a network slice allowing a communication terminal;
  transmitting identification information on the network slice, and identification information on the security parameter, to the communication terminal;
  receiving an NAS message encrypted using the security parameter, and the identification information on the network slice corresponding to the NAS message; and
  decrypting the NAS message using the security parameter associated with the identification information on the network slice,
  wherein the identification information on the network slice is set in a message to be processed using a protocol lower than a protocol for processing the NAS message.

18. A method of a core network device comprising:
  receiving a first message from a communication terminal via a node of an access network, wherein the first message is a registration request message; and
  sending a second message,
  wherein the second message is a registration accept message,
  wherein the first message includes first Network Slice Selection Assistance Information (NSSAI) and second NSSAI,
  wherein the first message is received in a third message from the node of the access network,
  wherein the third message is processed using a protocol lower than a NAS protocol, and
  wherein the third message includes third NSSAI.

19. The method according to claim 18, wherein the third message is an INITIAL UE message.

20. A method of a communication terminal, the method comprising:
  sending a first message to a core network device via a node of an access network,
  wherein the first message is a registration request message; and
  receiving a second message,
  wherein the second message is a registration accept message,
  wherein the first message includes first Network Slice Selection Assistance Information (NSSAI) and second NSSAI,
  wherein the first message is sent in a third message from the node of the access network to the core network device,
  wherein the third message is processed using a protocol lower than a NAS protocol, and
  wherein the third message includes third NSSAI.

21. The method according to claim 20, wherein the third message is an INITIAL UE message.

22. A core network device comprising:
  at least one memory storing instructions; and
  at least one processor configured to execute the instructions to:
    receive a first message from a communication terminal via a node of an access network,
      wherein the first message is a registration request message; and
    send a second message,
  wherein the second message is a registration accept message,
  wherein the first message includes first Network Slice Selection Assistance Information (NSSAI) and second NSSAI,
  wherein the first message is received in a third message from the node of the access network,
  wherein the third message is processed using a protocol lower than a NAS protocol, and
  wherein the third message includes third NSSAI.

23. A communication terminal comprising:
  at least one memory storing instructions; and
  at least one processor configured to execute the instructions to:
    send a first message to a core network device via a node of an access network,
      wherein the first message is a registration request message; and
    receive a second message,
  wherein the first message includes first Network Slice Selection Assistance Information (NSSAI) and second NSSAI,
  wherein the first message is sent in a third message from the node of the access network to the core network device,
  wherein the third message is processed using a protocol lower than a NAS protocol, and
  wherein the third message includes third NSSAI.

* * * * *